United States Patent [19]

Benjamin et al.

[11] Patent Number: 5,911,882
[45] Date of Patent: Jun. 15, 1999

[54] REMOVING CONTAMINANTS FROM WATER USING IRON OXIDE COATED MINERAL HAVING OLIVINE STRUCTURE

[75] Inventors: Mark M. Benjamin; Yu-Jung Chang; Christopher R. McMeen, all of Seattle, Wash.

[73] Assignee: University of Washington, Seattle, Wash.

[21] Appl. No.: 08/610,051

[22] Filed: Feb. 29, 1996

Related U.S. Application Data

[63] Continuation-in-part of application No. 08/466,268, Jun. 6, 1995, abandoned, which is a continuation-in-part of application No. 08/345,258, Nov. 28, 1994, abandoned, which is a continuation of application No. 07/992,644, Dec. 17, 1992, Pat. No. 5,369,072, which is a continuation-in-part of application No. 07/616,882, Nov. 21, 1990, abandoned, which is a continuation of application No. 07/367,507, Jun. 16, 1989, abandoned, which is a continuation-in-part of application No. 07/193,006, May 10, 1988, abandoned.

[51] Int. Cl.$^6$ .......................... B01D 15/00; B01D 15/04
[52] U.S. Cl. ........................................ 210/679; 210/691
[58] Field of Search ............................ 210/679, 688, 210/690, 691

[56] References Cited

U.S. PATENT DOCUMENTS

| | | |
|---|---|---|
| 2,076,545 | 4/1937 | Caldwell . |
| 2,163,525 | 6/1939 | Caldwell . |
| 2,163,526 | 6/1939 | Caldwell . |
| 2,163,527 | 6/1939 | Caldwell . |
| 2,367,496 | 1/1945 | Greentree . |
| 2,701,792 | 2/1955 | Owen . |
| 3,222,277 | 12/1965 | Joyce . |
| 3,470,104 | 9/1969 | Domas . |
| 3,499,837 | 3/1970 | Jaunhrajs . |
| 3,876,451 | 4/1975 | Zall . |
| 4,094,777 | 6/1978 | Sugier et al. . |
| 4,297,122 | 10/1981 | Wallace ...................................... 71/12 |
| 4,363,749 | 12/1982 | Weiss et al. ............................. 502/406 |
| 4,459,370 | 7/1984 | van der Wal et al. . |
| 4,475,397 | 10/1984 | Sood . |
| 4,565,633 | 1/1986 | Mayenkar . |
| 5,051,189 | 9/1991 | Farrah . |
| 5,369,072 | 11/1994 | Benjamin et al. . |

OTHER PUBLICATIONS

Anand, P., "Evaluation of ion–exchange properties of ferric–hydroxide flocs for the removal of heavy metal wastes using a high gradient magnetic separator," Ph.D. Thesis, Purdue University, 1984.

Anand, P., et al., "Heavy metals removal by high gradient magnetic separation," *IEEE Transactions on Magnetic*, MAG–21(5):2062–2064, 1985.

Anderson, N.J., et al., "Colour and turbidity removal with reusable magnetic particles–III: immobilized meta hydroxide gels," *Water Res.*, 16:1327–1334, 1982.

Anderson, P.R. and M.M. Benjamin, "Effects of Silicon on the crystallization and adsorption properties of ferric oxides," *Environ. Science & Technology*, 19(11):1048–1053, 1985.

(List continued on next page.)

*Primary Examiner*—Walter D. Griffin
*Assistant Examiner*—In Suk Bullock
*Attorney, Agent, or Firm*—Christensen O'Connor Johnson & Kindness

[57] ABSTRACT

Adsorbent media are prepared by contacting support material with iron containing solutions, followed by drying to coat the support material with iron. Support material such as sand and olivine are described. The adsorbent material can be used to remove metal contaminants and natural organic matter from water.

8 Claims, 22 Drawing Sheets

OTHER PUBLICATIONS

Chen, A.S.C. and V.L. Snoeyink, "Activated alumina adsorption of dissolved organic compounds before and after ozonation," *Environ. Science & Technology*, 21(1):83–90, 1987.

Chen, A.S.C., et al., "Activated alumina for removing dissolved organic compounds," *Journal AWWA*, pp. 53–60, Jan. 1989.

Davies, S.H.R. and J.J. Morgan, "Manganese (II) oxidation kinetics on metal oxide surfaces," *J. Colloid and Interface Science*, 129(1):63–77, Apr. 1989.

Edwards, M. et al., "Regeneration and Reuse of Iron Hydroxide Adsorbents in Treatment of Electroplating Wastes," *Proceedings of the 60th Industrial Waste Symposium*, Philadelphia, PA, pp. 142–155, 1987.

Hlavay, J. et al., "Removal of arsenic from natural waters, in Chemistry for Protection of the Environment," Elsevier, NY, pp. 373–380, 1983.

Jenne, E.A., "Controls on Mn, Fe, Co, Ji, Cu, and Zn concentrations in soils and water: the significant role of hydrous Mn and Fe oxides," *Advances in Chemistry*, 73:337–387, 1968.

Kinniburgh, D.G. and M.L. Jackson, "Cation adsorption by hydrous metal oxides and clay, in Adsorption of Inorganics at Solid–Liquid Interfaces," Ann Arbor Science Publishers, Inc., Ann Arbor Science Publishers, Inc., Ann Arbor, MI, pp. 91–103, 1981.

Knock, W.R., et al., "Soluble manganese removal on oxide–coated filter media," *Journal AWWA*, pp. 65–70, Dec. 1988.

Lion, L. W., et al., "Trace–metal adsorption characteristics of estuarin particulate matter: evaluation of contributions of Fe/Mn oxide and organic surface coatings," *Environ. Science & Technology*, 16(10):660–666, 1982.

Schultz, M.F., "Desorption of cations from ferrihydrite," Masters Thesis, University of Washington, pp. 28–41 and 52–76, 1985.

Schultz, M.R. et al., "Adsorption and Desorption of metals on ferrihydrite: reversibility of the reaction and sorption properties of the regenerated solid," *Environ Science & Technology*, 21(9):863–869.

Tobiason, J.E. and C.R. O'Melia, Physicochemica aspects of particl removal in depth filtration,*Journal AWWA*, pp. 54–64, Dec. 1988.

Valentine, R.L., et al., "Factors affecting radium reduction in an iron removal process," *AWWA Annual Conference Proceedings*, pp. 1377–1395, 1985.

Valentine, R.L., et al., "A regenerable sand filtration process for removing radium," Unpublished, 1986.

Valentine, R.L., et al., "Radium removal from groundwater using sorption to filter sand," *1986 ASCE National Conference on Environmental Engineering*, Cincinnati, OH, 1986.

Valentine, R.L., et al., "Radium removal using sorption to filter sand," *Journal AWWA*, pp. 170–176, Apr. 1987.

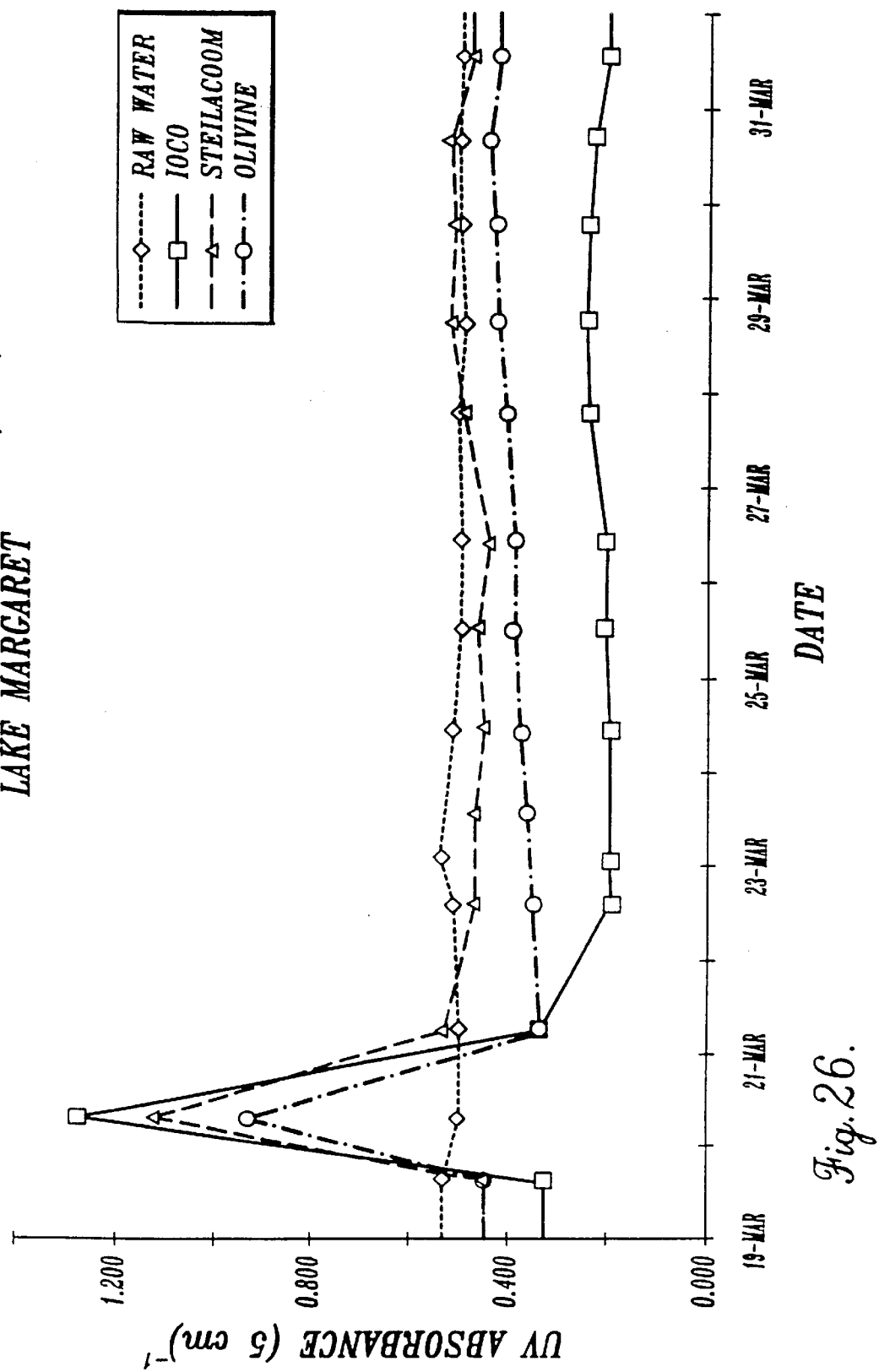

REMOVING CONTAMINANTS FROM WATER USING IRON OXIDE COATED MINERAL HAVING OLIVINE STRUCTURE

This is a continuation-in-part of prior application Ser. No. 466,268 filed Jun. 6, 1995, now abandoned, which in turn is a continuation-in-part of prior application Ser. No. 08/345,258, filed on Nov. 28, 1994, now abandoned, which in turn is a continuation of prior application Ser. No. 07/992,644, filed on Dec. 17, 1992 and now U.S. Pat. No. 5,369,072, which in turn is a continuation-in-part of application Ser. No. 616,882, filed Nov. 21, 1990, now abandoned, which in turn is a continuation of application Ser. No. 367,507, filed Jun. 16, 1989, now abandoned, which in turn is a continuation-in-part of application Ser. No. 193,006, filed May 10, 1988, now abandoned, the benefit of the filing dates of which are hereby claimed under 35 U.S. C. § 120.

FIELD OF THE INVENTION

The present invention relates to media for removing contaminants from water, methods of making such media, and methods of removing contaminants from water using such media.

BACKGROUND OF THE INVENTION

Slow sand filtration as a method of treating surface water for potable use is being promoted by federal and state regulators due to its simplicity of operation, its proven capability to remove turbidity and pathogenic microorganisms such as *Giardia lamblia*, and its historical reliability. Generally slow sand filtration involves passing contaminated water through a bed of sand at a flow rate of approximately 0.04 to 0.08 gallons/minute-ft$^2$. As the water passes through the bed, some of the organisms and inorganic particles in the water are filtered out, and some of the soluble contaminants are biodegraded. Micro-organisms growing in the upper layers of the bed gradually clog it, increasing the pressure differential (head loss) needed to maintain the desired throughput rate. When clogging becomes severe, the upper few inches of the bed are scraped off, and the treatment process is resumed.

During the disinfection of drinking water, halogenated disinfection byproducts (DBPs) can be generated by the reaction of disinfectants with natural organic matter (NOM) in the water source. The DBPs receiving the most attention at present are the trihalomethanes (THMs) and five haloacetic acid compounds. The natural organic compounds that react with disinfectants to form DBPs are commonly referred to as DBP precursors. These DBP precursors are usually measured in terms of surrogate parameters, such as the trihalomethane formation potential (THMFP), dissolved or total organic carbon (DOC or TOC, respectively), or the ability of the water to absorb ultraviolet light at a wavelength of 254 nanometers.

Research conducted by Collins et al. and reported in Collins, M. R., T. T. Eigling, J. M. Fenstermacher, and S. K. Spanos "*Modifications to the Slow Sand Filtration Process for Improved Removals of Trihalomethane Precursors*" Denver, Colo., AWWARF 1989, has shown that slow sand filters that are operating satisfactorily in terms of turbidity removal typically remove only about 5–25% of the DBP precursors, measured in terms of any of the surrogate parameters described above. Several alternatives to enhance the removal of NOM in slow sand filters have been investigated, including the use of preozonation and filter medium amendments, such as granular activated carbon, and anionic exchange resins. While these approaches improve NOM removal, they come with the price of shortened filter run times.

There are many different iron oxide minerals, each with unique properties. Many of these minerals have properties that are useful for treating water contaminated with certain types of pollutants. Specifically, the minerals often have high specific surface area (area per gram of Fe) and surfaces that have a chemical attraction for a number of contaminants, including natural organic matter and many metals. As a result, contaminants that are initially dissolved in the water may adsorb onto (i.e., bind to the surface of) the minerals. The adsorption reactions tend to be quite pH-dependent, so that contaminants that are adsorbed at one pH can often be released when the solution is adjusted to a different pH. In general, anions (negatively-charged contaminants) are bound at lower pH values and released at higher pH values, while cations behave oppositely. This pH dependency is an important characteristic of the contaminant-surface interaction, because it means that, when the surface is saturated, the adsorbed contaminant can be easily desorbed so that the adsorption capacity can be reused to treat subsequent volumes of water. The exact pH range where contaminants are adsorbed or desorbed depends on the identity of the ion itself and the identity of the adsorbing surface. Thus, a generic statement that, e.g., "chromate is adsorbed at pH xx and desorbed at pH yy," or that "iron oxide adsorbs cations at pH zz and releases them at pH ww" cannot be made. What can be said with some confidence is that under reasonable conditions, many iron oxides do adsorb many ionizable contaminants.

Even if contaminants of interest are adsorbed onto the particles, they still pose a potential hazard to the consumer of the water or to the environment unless the contaminant-laden particles are removed from the water. Unfortunately, the bulk properties of most iron oxides are not conducive to easy removal from the water. The particles that form when ferric ions are initially precipitated as ferric hydroxide solids tend to be small and highly hydrated, so their densities are only slightly greater than that of water. Accordingly, they settle very slowly. When packed in a small volume, they are virtually impermeable to water, so they cannot be used in a packed bed system (e.g., holding them in a confined space and passing water through them). For the same reason, it is very difficult to filter large quantities of these particles out of water, since the filter rapidly becomes clogged. Although the degree of hydration can be reduced, and the hydraulic conductivity can be increased by heating the particles, this significantly reduces the surface area available for adsorption and still yields small, difficult-to-handle particles.

Other adsorbents commonly used in water treatment include activated carbon and synthetic resins. Both of these are available in forms which can be packed in columns, so the water can be passed through the medium without any need for subsequent solid/liquid separation steps. However, granular activated carbon cannot be regenerated on-site, and synthetic resins are often fouled by particulate matter.

In addition to dissolved contaminants, water also contains many contaminants that are not dissolved, but rather are in the form of suspended particles. These particles can be removed by some type of filtration process. Filtration through a bed packed with a granular medium (e.g., sand) is perhaps the most common technology used for this purpose. Desirable properties of a medium used for this purpose include high hydraulic conductivity, resistance to shear and abrasion (since the medium is usually cleaned by fluidizing the packed bed), and negligible solubility under the conditions of use. Most filtration media do not have surface properties that are useful with respect to collecting dissolved contaminants from solution. Thus, there does not exist a convenient adsorbent/filter that is widely applicable for removing both soluble and particulate contaminants from water.

The potential advantages of having iron oxide (or other regenerable oxide adsorbents) available in a granular form have been recognized for many years, and a number of patents have been granted for processes to prepare such media. Several of these patents are discussed below. However, numerous forms of iron oxide exist, and neither their properties nor the transformations among them are well understood (except for transformations among a few, very pure forms). Furthermore, the factors that control the bond strength between an iron oxide surface layer and an underlying substrate are very unpredictable. As a result, while attempts to formulate such media might be guided by a rational set of hypotheses, the outcome is always uncertain.

U.S. Pat. No. 3,876,451 to Zall et al. describes a procedure for embedding a metal oxide in a matrix of activated carbon; for the purpose of removing phosphate anions from the water by the formation of an insoluble product containing the phosphate. In accordance with Zall et al., carbon is initially saturated with the metal by exposure to a solution of the metal chloride. Zall et al. notes that this can be achieved by exposing the carbon to the solution and then decanting the liquid, since the metal will be retained by the surface and in the pores of the activated carbon. After saturation, the material is dried and exposed to a solution containing an amount of sodium hydroxide in excess of the stoichiometric requirement. The material is then dried again and is ready for use.

U.S. Pat. No. 2,367,496 to Greentree describes the formation of an enhanced decolorizing agent which is made by incorporating iron into a hydrated magnesium silicate matrix. The first step described by Greentree is the exposure of magnesium silicate particles to an iron-containing solution, such that all the iron is adsorbed by the magnesium silicate. The direct use of this Fe-impregnated material, or the conversion of the impregnated Fe to $Fe(OH)_3$ by addition of a base, and, optionally, the heating of the $Fe(OH)_3$-impregnated material to dryness, is described by Greentree.

U.S. Pat. No. 3,499,837 to Jaunarajs describes a process in which iron-oxide-coated medium is used to collect phosphate from waste waters. The method for preparing the coated medium involves exposure of a finely divided solid, such as diatomaceous silica filter aids, to a ferric sulfate solution, addition of a base to that solution to achieve near-neutral pH (e.g., pH 6.0 and 6.5), and drying of the resultant solid, either in air or at elevated temperatures.

U.S. Pat. No. 4,363,749 to Weiss et al. describes two methods for preparing adsorbent surfaces. The first involves "activating" the surface of an existing material. The second involves adding a solution containing iron (or other multi-valent ion) to a suspension of the support material, and neutralizing with 'an alkaline material.' In the examples of Weiss et al., the neutralization is to pH>7. Weiss et al. emphasizes the need to use very small particles (diameter <10 mm) and to avoid drying the material once the coating has been formed.

U.S. Pat. No. 4,459,370 to van der Waal describes that an iron-containing solution must be added very slowly to a suspension of the support material, and that the base necessary to neutralize and precipitate the iron onto the surface of the support is generated by the hydrolysis of urea or cyanate, which are added to the solution. The reaction takes place at pH 4 to 7 and at elevated temperatures.

A list of the properties that would be displayed by an ideal medium might include:

Medium must adsorb contaminants

Medium must be easily regenerable, in situ

Medium must resist abrasion associated with bed fluidization

Medium must resist dissolution when exposed to chemical conditions for adsorption and regeneration.

While pure iron oxides are known that meet the first two criteria, and several minerals are known that meet the last two criteria, there is a need to find a way to combine all four into a single medium.

SUMMARY OF THE INVENTION

The present invention relates to adsorbent materials that combine the desirable surface properties of iron oxide with the bulk properties of a granular medium and methods for using such materials to remove contaminants from water. As noted in the Background of the Invention, this combination has two potential benefits. First, if the medium is used strictly as an adsorbent, the physical form allows one to use it in a packed bed arrangement. Second, the medium can be used simultaneously as the packing for a filter bed. Since most waters needing treatment contain both particulate and soluble contaminants, the simultaneous removal of both types of contaminants can provide a significant cost savings over the use of independent treatment processes.

Several approaches for preparing iron-oxide-coated granular medium for use in adsorbing contaminants from water are described. The first two involve heating to dryness a solution that contains ferric ions in the presence of the granular medium. In one case, the solution is prepared by dissolving ferric nitrate in water; in the other, ferric chloride is dissolved in water. In the absence of other considerations, the latter approach would be preferred, since ferric chloride is cheaper than ferric nitrate. In fact, ferric chloride is a waste product generated during the pickling (surface cleaning) of iron and steel materials. The procedures described involve mixing iron-containing solutions with a support material, such as a granular medium, and spreading the mixture in a thin layer in an appropriate container. The container is then placed in an oven and heated until the mixture is dry. In these processes, the water and hydrochloric or nitric acid (depending on whether ferric chloride or nitrate is used, respectively) are evaporated, and a ferric oxide layer is deposited on the surface of the support material.

The coating of iron oxide that forms when ferric nitrate is used as the iron source remains dry and stable and can be used immediately as an adsorbent for metal ions and filtering particulate matter from water. On the other hand, when a coated support material prepared with ferric chloride is exposed to air, the coating becomes moist, i.e., it is hygroscopic. At this point, the coating rapidly detaches from the support material when exposed to a basic solution. Since strongly basic solutions are used to regenerate adsorbent medium after adsorption of anionic metals, this instability is generally considered unacceptable. However, in accordance with the present invention, if the heating and cooling cycle is repeated several times, the medium becomes progressively less hygroscopic and more resistant to basic solutions.

In a third approach, a method is provided for preparing an adsorbent media useful for reversibly adsorbing natural organic matter and for filtering particulate matter from water. The method involves the steps of preparing an aqueous solution containing ferric chloride and hydroxyl ion. The solution is then heated to provide a paste. This paste is then contacted with a support material to provide a mixture which is then dried. In a preferred embodiment of this aspect of the present invention, the hydroxyl ion to ferric ion molar ratio is about 2.0 to 2.5.

In accordance with the present invention, water containing natural organic matter can be treated to reduce the concentration of natural organic matter by contacting the water with a medium comprising an iron-oxide coated mineral having an olivine structure. In accordance with the present invention, the iron-oxide coating can be provided in accordance with the present invention, preferably using the method in accordance with the first aspect or third aspect described above. The resulting iron-oxide coated mineral having an olivine structure is particularly useful and effective in removing natural organic matter from water when the coated structure is contacted with the water containing natural organic matter under conditions normally associated with slow sand filtration techniques. The use of such structures under such slow filtration conditions results in an unexpectedly high removal rate of organic matter from water in accordance with the present invention.

In the following Detailed Description, several embodiments of methods for the preparation of the composite medium are described in more detail, as well as methods of using the medium to remove contaminants, such as natural organic matter from water in accordance with the present invention. Applicants have observed that the distinctions between the prior art discussed above and the present invention can have dramatic and unpredictable effects on the properties of the resulting medium and its ability to adsorb metal ions and natural organic matter, and filter particulate matter.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 26 is a graph of UV absorbence at 254 nanometers for raw and filtered water from Lake Margaret before and after chlorination.

Figure 1:
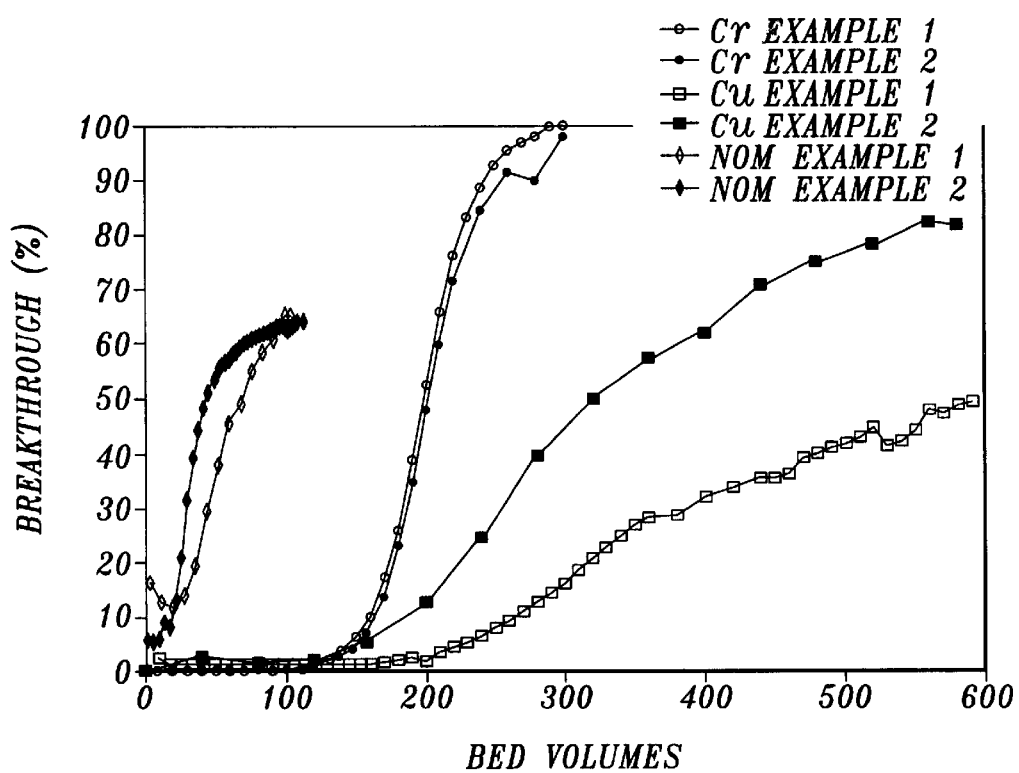
FIG. 1 is a graph of effluent concentrations in a solution containing copper, chromate, or natural organic matter (NOM) after passing over a column packed with iron-oxide-coated sand prepared in accordance with first and second embodiments of the present invention.

In the foregoing figures, the bed volumes of the x-axis refer to the number of empty bed volumes treated. Since the porosity of the packed beds was around 0.33, the number of bed pore volumes treated can be computed by multiplying the number on the x-axis by 3.

DETAILED DESCRIPTION OF THE PREFERRED EMBODIMENT

The support material for mixing with the iron-containing solutions or mixtures formed in accordance with the present invention should resist abrasion normally encountered in fluidized beds. The support material should also resist dissolution when exposed to conditions which promote adsorption and desorption of contaminants from water. Examples of such support material include sand, magnesium oxide, dolomite, olivine, activated charcoal, kaolinite, illite, montmorillonite, glass beads, and charcoal. As described in Example 4 and illustrated in FIG. 8, an adsorbent medium prepared in accordance with the present invention using olivine as the support material adsorbs natural organic matter at higher levels than adsorbent media prepared using other support materials. Olivine is a neo-silicate with a composition $(Mg, Fe)_2SiO_4$. It comprises a complete solid solution series from the pure iron member fayalite, $Fe_2SiO_4$, to the pure magnesium member forsterite, $Mg_2SiO_4$. Minerals of intermediate composition have been given their own names but are usually designated simply as olivine. The minerals tephroite, monticellite, and larsenite, although not in this chemical series, are of the olivine structure type.

Support material used to produce adsorbent media for water treatment typically range from a few tenths of a millimeter in diameter to several millimeters in diameter. In general, larger media have the advantage that they provide less resistance to water flow and clog less easily; however they have the disadvantage that they have less surface area per unit volume, so less coating can be packed into a given size column. An additional limitation of some large media in the context of the present invention is that the shear force needed to fluidize a bed increases as the size of the medium increases (for a given medium density). As described below in more detail in Example 5, depending on the specific support material, the increased shear forces for larger particles may cause the coating to be sheared off the surface.

Ferric nitrate or iron nitrate for forming iron-containing solutions in accordance with the present invention are derived from the action of concentrated nitric acid on scrap iron or iron oxide in crystallizing. Other methods of deriving ferric nitrate are known and provide acceptable sources of ferric nitrate. Ferric nitrate generally has a chemical formula $Fe(NO_3)_3 \cdot 9H_2O$. Ferric nitrate is generally found in the form of a violet crystal having a density of 1.684, a melting point of 47.2° C. and decomposes at 125° C. Ferric nitrate is soluble in water and in alcohol.

Ferric chloride ($FeCl_3 \cdot 6H_2O$) or ferric trichloride, ferric perchloride, iron chloride, iron trichloride or iron perchloride, as it is otherwise known, for forming iron-containing solutions or pastes in accordance with the present invention, are derived from the action of chlorine on ferrous sulfate or chloride. Other methods of deriving ferric chloride are known and provide acceptable sources of ferric chloride. Ferric chloride generally has a melting point of 37° C. at which it decomposes. Ferric chloride is soluble in water, alcohol, glycerol, methanol, and ether. It is generally non-combustible.

The hydroxyl ion present in aqueous solutions of ferric chloride in accordance with the present invention may be provided by adding any common base. For example, hydroxide ions can be provided by adding sodium hydroxide, potassium hydroxide, calcium hydroxide, or sodium carbonate to the aqueous solution of ferric chloride in accordance with the present invention. Sodium hydroxide is available from many commercial sources and can be derived by electrolysis of sodium chloride or the reaction of calcium hydroxide and sodium carbonate.

In accordance with one aspect of the present invention, iron oxide coated granular medium for reversibly adsorbing metal ions and for filtering particulate matter from water can be provided by contacting an aqueous solution containing ferric nitrate with a support material to form a mixture which is then heated to dryness. The resulting dried medium comprising iron oxide formed on the support material remains dry and stable and can be used immediately as an adsorbent.

The aqueous solution containing ferric nitrate can be formed by adding ferric nitrate to water. The exact molarity of iron in solution does not appear to be critical. An aqueous solution of ferric nitrate made by dissolving 2 to 2.5 moles of pure $Fe(NO_3)_3 \cdot 9H_2O$ per liter has been found to be acceptable. In accordance with this aspect of the present invention, small amounts of base can be added to neutralize a small portion of the iron in solution; however, the amount of base added should be much less than that needed to fully neutralize the iron. If the iron is fully neutralized, the bond that forms between the iron and the underlying medium when the mixture is heated is very weak, and only a small fraction of the iron remains attached to the surface when the medium is wetted.

After the aqueous solution of ferric nitrate is formed, it is combined with a support material. The ratio of solution to support material is not critical, and acceptable results have been achieved when there is enough solution to just fill the pore spaces between the individual particles of support material. To ensure complete contact of the aqueous solution with the support material, gentle mixing may be necessary.

After the contacting step, the water and acid in the mixture of aqueous solution and support material is driven off by heating. The heating should be continued until the particles are dry as evidenced by visual observation and the absence of any odor of nitric acid emanating from the drying mixture. Drying can be carried out by placing a container containing the support material and the aqueous solution of ferric nitrate in a convection oven and operating the oven at a temperature in the range between about room temperature and about 110° C. For example, a drying temperature of 110° C. provides acceptable results. Drying can also be accomplished at temperatures above 110° C.; however, drying at 220° C. was found to decrease the adsorptive effectiveness of the resulting adsorbent medium compared to an adsorptive medium produced by drying at 110° C. When the drying temperature is near the upper end of the range, the drying times will be shorter than when the drying temperatures are near the lower end of the range. As an alternative to an oven, microwave radiation could be used to dry the medium. Decreasing the thickness of the layer of the mixture of support material and aqueous solution of ferric nitrate reduces the drying time for a given drying temperature.

In accordance with this aspect of the present invention, the contacting and heating steps described above can be repeated by recovering support material that has already been exposed once to the contacting and heating step and using that as a support material for subsequent contacting and heating steps. Repeating the contacting and heating steps may increase the total amount of iron on the surface of the support material.

Figure 10:
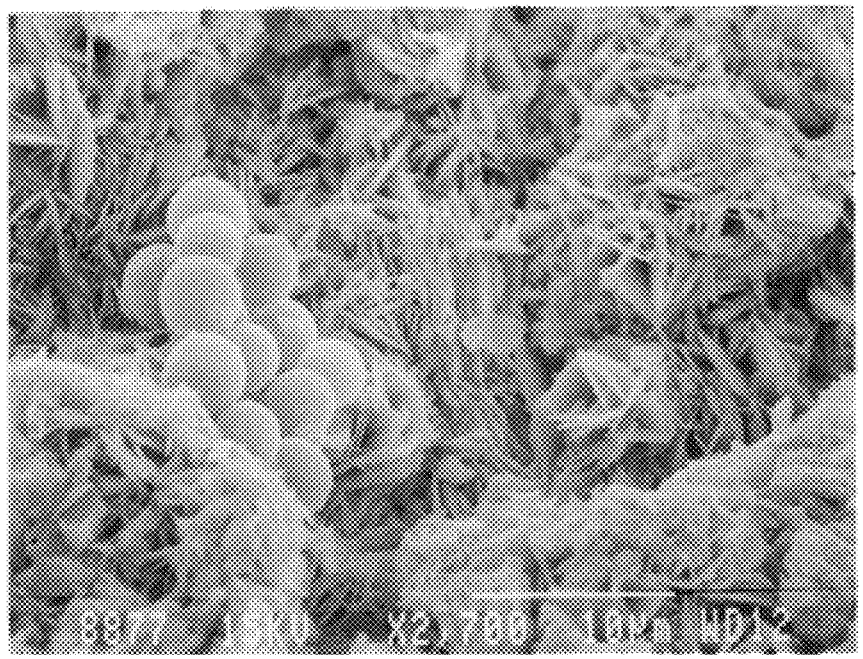
FIG. 10 is a photomicrograph of the surface of an adsorbent medium prepared in accordance with the first aspect of the present invention magnified 2,700 times.

The resulting adsorbent material is useful for reversibly adsorbing metal ions such as zinc, nickel, cadmium, copper, lead, chromium, chromate, molybdate, arsenate, arsenite, selenite, and others and for filtering particulate matter from water. Example 1 set forth below describes one method for producing such an adsorbent material and provides performance data for such material. FIG. 10 is a photomicrograph of the surface of an adsorbent medium prepared in accordance with this aspect of the present invention magnified 1,000 times.

In accordance with a second aspect of the present invention, an adsorbent material useful for reversibly adsorbing metal ions and for filtering particulate matter from water can be produced by contacting an aqueous solution containing ferric chloride with a support material to form a mixture. The mixture is then heated to dryness and subsequently rehydrated. In a preferred embodiment, the rehydrated adsorbent medium is repeatedly heated to dryness and rehydrated, which renders the adsorbent medium less hygroscopic and less susceptible to detachment of the ferric oxide coating when exposed to strongly basic solutions.

As with the ferric nitrate described above, the concentration of the ferric chloride in the solution is not believed to be critical. Solutions made by dissolving 2 to 2.5 moles of ferric chloride per liter have produced acceptable results. Gentle mixing may enhance the dissolution of the ferric chloride in solution. In accordance with this aspect of the present invention, small amounts of base can be added to neutralize a small portion of the iron in solution; however, the amount of base added should be much less than that needed to fully neutralize the iron. If the iron is fully neutralized, the bond that forms between the iron and the underlying medium when the mixture is heated is very weak, and a very small portion of the iron remains attached to the medium when it is wetted.

After the solution of ferric chloride is formed, it is contacted with the support material as described above with respect to the aqueous solution of ferric nitrate and the support material. Support materials that are useful in the context of this aspect of the present invention include those support materials described above. The ratio of support material to solution can vary, although from an efficiency standpoint, it is preferred to use enough solution to just fill the pore spaces between the particles of the support medium.

After the contacting step is completed, the mixture of ferric chloride solution and support material is heated to dryness. Drying at about 110° C. provides acceptable results. Drying at temperatures down to about room temperature should also provide acceptable results; however, as the temperature at which the drying is carried out decreases, the time for drying increases. Drying may also be accomplished at temperatures above 110° C.; however, when the drying temperature is about 220° C. the adsorption effectiveness of the resulting adsorbent medium decreases compared to an adsorbent medium dried at about 110° C. The drying can be accomplished by using an oven as described above with respect to the first aspect of the present invention which employs ferric nitrate. Microwave radiation would be a suitable drying alternative.

After the mixture is dried, the particles are collected and rehydrated by exposure to air at room temperature. If the particles adsorb water and appear wet, in accordance with a preferred embodiment they should be redried, cooled, and re-exposed to the air several times until they cease to adsorb a significant amount of water. Initially, the degree of rehydration will be indicated by the wet appearance of the surface of the particle. After several drying and hydration cycles, the medium will not tend to appear as wet; however, the individual grains will tend to stick to each other. When the medium is completely dry, no such adhesion between grains occurs.

If the particles are not treated sufficiently to reduce their adsorption of water, the coating will become moist and readily detach from the support material when the medium is exposed to a basic environment. Since strongly basic environments are used to regenerate adsorbent media after adsorption of anionic metals, this instability is considered unacceptable. Acceptable stability has been observed when the particles are subjected to seven cycles of heating and rehydration, each cycle comprising 20 hours of rehydration at room temperature followed by 3 hours of drying at about 110° C. Example 2 describes one method of producing an adsorbent medium in accordance with this second aspect of the present invention.

Figure 11:
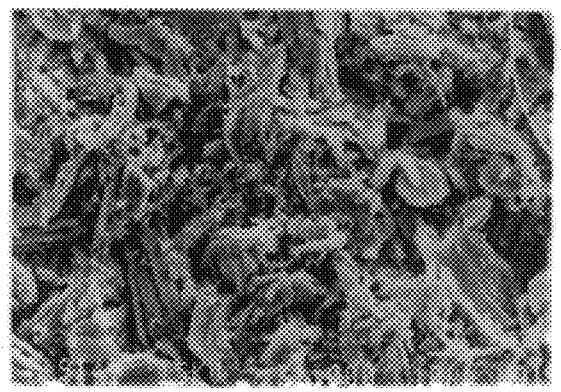
FIG. 11 is a photomicrograph of the surface of an adsorbent medium prepared in accordance with the second aspect of the present invention magnified 1,000 times.
Figure 12:
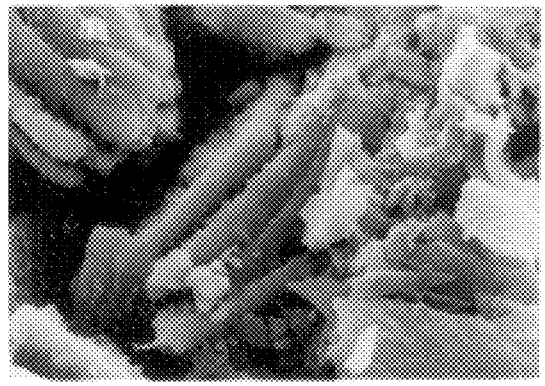
FIG. 12 is a photomicrograph of the adsorbent medium of FIG. 11, magnified 5,000 times.

The resulting product is an adsorbent medium that is capable of adsorbing metal ions and filtering particulate material from water. The particles are stable under basic conditions which are generally encountered when adsorbent materials are regenerated after adsorbing anionic metals. FIGS. 11 and 12 are photomicrographs of the surface of an adsorbent medium prepared in accordance with the second aspect of the present invention magnified respectively 1,000 times and 5,000 times.

In accordance with the third aspect of the present invention, an adsorbent medium useful for reversibly adsorbing natural organic matter and for filtering particulate matter from water is produced by a method that includes the steps of preparing an aqueous solution containing ferric chloride and hydroxyl ion, heating the solution to provide a paste, contacting the paste with a support material to provide a mixture, and drying the mixture. The adsorbent medium produced by this aspect of the present invention is useful for adsorbing natural organic matter such as humic acid and fulvic acids. (It is currently beyond current scientific capabilities to identify precisely the composition of the molecules that comprise natural organic matter. Many of these molecules are degradation products from the decay of living matter. In the absence of a more precise classification, the wide range of natural organic compounds is classified into a few composite categories. Humic and fulvic acid are the largest such categories. It has been estimated that, on average, 50% of the dissolved organic matter in rivers falls into these two categories, although the percentage in any particular river could be anywhere from 10% to 90%.)

In accordance with the present invention, the aqueous solution of ferric chloride can be formed as described above with respect to the second aspect of the present invention. Hydroxyl ion is then added to this aqueous solution of ferric chloride. The hydroxyl ion can be provided by the addition of any common base to the solution. The base should be added in an amount that provides a ratio of approximately 2.0 to 2.5 moles hydroxyl ion per mole of iron. For such a solution, when the molar ratio of hydroxyl ion to iron is approximately 2.0 to 2.5, pH of the solution ranges from about 1.0 to 1.6. When this amount of hydroxyl ion is added to the solution, the ferric chloride solution is only partially neutralized. When the ratio of hydroxyl ion per mole of iron falls in the range described above, the resulting adsorbent medium has been found to be a superior adsorbent for natural organic matter compared to when the ratio is outside the described range. For example, when the ratio of hydroxyl ion per mole of iron is about 3.0 or slightly greater, (corresponding to a solution pH greater than or equal to about 7.0) the ferric chloride solution is fully neutralized. When a fully neutralized solution is contacted with a support material such as sand, the majority of the iron coating is released when the coated support material is wetted.

After the solution of ferric chloride and hydroxyl ion is formed, it is heated to drive off water and provide a paste. The heating can be carried out at a temperature on the order of about 110° C., although other temperatures may be suitable. Heating should be continued until the water content of the solution is approximately 45 to 55% by weight.

Although not required, the heated mixture may be cooled before going on to the contacting step. The heating step provides a paste which is then contacted with the support materials described above. The ratio of paste to support material will depend on the type of support material and the water content of the paste. Weight ratio on the order of 1 part paste to 10 parts support material has produced acceptable results when the support material is sand. Contacting the paste with the support material should be facilitated by mixing so that the individual particles are evenly coated. After the contacting step, the mixture is dried by heating it, for example, at 110° C. in an oven, or by using microwave radiation.

In accordance with this aspect of the present invention, the contacting and drying steps may be repeated using particles from the first drying step as the support material in subsequent contacting steps.

Figure 13:
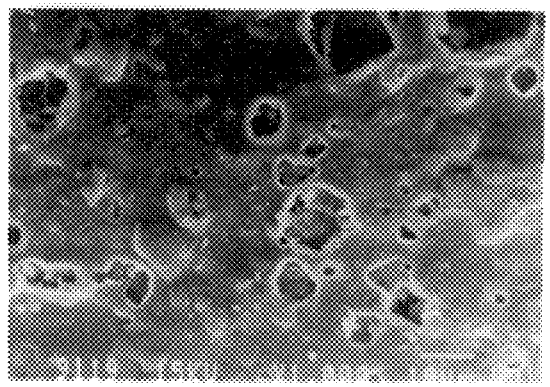
FIG. 13 is a photomicrograph of the surface of an adsorbent medium prepared in accordance with the third aspect of the present invention magnified 1,000 times.
Figure 14:
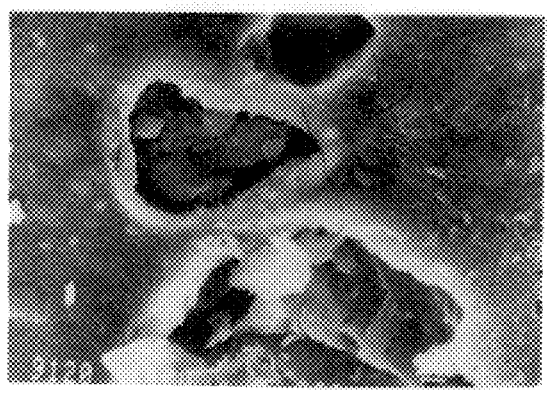
FIG. 14 is a photomicrograph of the adsorbent medium of FIG. 13, magnified 5,000 times.

The resulting product is an adsorbent material useful for reversibly adsorbing natural organic matter and for filtering particulate material from water. Example 3 describes one method of preparing an adsorbent medium in accordance with this third aspect of the present invention. FIGS. 12 and 13 are photomicrographs of the surface of an adsorbent medium prepared in accordance with this third aspect of the present invention magnified respectively 1,000 and 5,000 times.

The adsorbent medium described above can be used in any of the conventional ways in which existing adsorbent medium are used, for example, the adsorbent medium can be used in fixed or fluidized beds for contacting with water to remove dissolved and particulate matter. The adsorption reactions tend to be quite pH dependent, so that matter that is adsorbed at one pH is often released when the solution is adjusted to a different pH. In general, anions are bound at lower pH values and released at higher pH values, while cations behave oppositely.

As noted above, applicants have found that when olivine is used as the support material in the third aspect of the present invention, an adsorbent medium is provided which adsorbs natural organic matter at levels higher than adsorbent medium prepared using other support materials, particularly in the pH range 6.0 to 8.0. This pH range is particularly important because it is the pH range of most natural waters. Thus, such waters can be treated in accordance with this aspect of the present invention without any pH adjustment to the water. This enhanced adsorption of natural organic materials by olivine based adsorbents is described in Example 4 and illustrated in FIG. 8.

More specifically, when the olivine type of support materials described above are coated with iron oxide, preferably in accordance with the first (e.g., ferric nitrate) or third (e.g., paste formation) aspect of the present invention and employed in a filtration system operating at flow rates similar to those used in conventional slow sand filtration processes, e.g., on the order of 0.12–0.25 meters per hour (0.0066–0.014 ft/min.) or less to remove contaminants from water, the initial concentration of DBP precursors is reduced significantly and to a much greater degree than when support material conventionally used at such slow rates, such as sand, is employed.

It should be understood that the range of flow velocities noted above are exemplary and are not intended to limit the present invention to a particular upper limit of flow velocity. As a means for determining the upper limit of the flow velocities wherein the advantageous organic removal characteristics of the present invention are achieved, it is believed that the improved ability to remove organic matter can be achieved so long as the system can operate long enough for a biological population to build up within the media. Without intending to be limited to any particular theory, it is believed that the presence of a biological population within the filter bed is one explanation as to why the olivine-type support material is coated with iron oxide in accordance with this aspect of the present invention provides improved removal of organic matter under slow filtration conditions. Flow velocities which cause a buildup of organic matter to the extent that regeneration of the media bed is required will be generally unacceptable because the regeneration will flush out and destroy the biological population.

Example 6 provides an illustration of the degree that an iron oxide coated olivine type support material is able to remove DBP precursors such as NOM and compares the removal rate to uncoated olivine and uncoated sand. The inventors have treated water containing natural organic matter in three filter columns packed with different filter media, with each column operated under conditions typical of those used for slow sand filtration. The three filter media tested were an iron oxide coated olivine, and uncoated olivine, and an uncoated sand. It was observed that the absorbence at 254 nanometers of the water that was treated in the column packed with coated olivine was at least 30% and more preferably 50% less than that of the water that was treated in either of the other two columns. This result was obtained when treating raw water from two different sources. In addition, the iron oxide coated olivine type support material was able to reduce the dissolved organic carbon content of the water containing natural organic matter by at least 20%, and more preferably by at least 30–40%. It should be understood that while the foregoing amounts of decrease in the ultraviolet absorbence of the water containing natural organic material and the decrease in the dissolved organic carbon content have been described above with reference to specific amounts, it is preferable to remove as much of the natural organic matter represented by the ultraviolet absorbence as possible, as well as to reduce the total organic carbon content as much as possible.

In addition to the enhanced adsorption of natural organic matter, applicants have found that when olivine is used as a support material, for example, in the third aspect of the present invention, the coating exhibits a resistance to abrasion that is higher when an adsorbent medium is prepared according to the third aspect of the present invention using sand as the support material. This enhanced resistance to abrasion is described in more detail in Example 5. Due to this enhanced abrasion resistance, an adsorbent medium prepared using olivine could be used as a filter at the same time that it is used as an adsorbent. The filtration process is independent of the adsorption process. Filtration would remove particles whereas adsorption would remove dissolved molecules. The particles that can be removed by filtration can be either organic or inorganic and would not be related in any direct way to the organic matter that the coating would remove by adsorption.

EXAMPLES

Example 1
(Ferric nitrate solution)

An aqueous solution having 2.3M concentration of ferric nitrate was prepared. This solution was mixed at room temperature with sand obtained from Unimin Corp. under the brand name Filtrsil. The sand is commonly known as "Ottawa sand". Prior to mixing with the solution of ferric nitrate, the sand was sieved, and the fraction between sieve sizes corresponding to 20 and 30 mesh (0.60–0.85 millimeters diameter) was collected for use. Enough solution was used to fill the pore spaces between the particles of sand. This mixture of sand and ferric nitrate solution was placed in a Pyrex baking dish and heated in an oven at 110° C. to dryness. The heating drove off both the water and the acid from the solution.

Example 2
(Ferric chloride solution)

The procedure of Example 1 was repeated using ferric chloride instead of ferric nitrate as the source of iron in the coating solution. After the mixture was dried by heating at 110° C. for 3 hours, it was allowed to cool and rehydrate in air for 20 hours. The cooled and rehydrated mixture was then re-dried, re-cooled, and re-exposed to air six times.

Plexiglas tubes were packed with an adsorbent medium prepared in accordance with Examples 1 and 2. Separate solutions containing an influent amount of different contaminants, chromate, copper, or natural organic matter, were prepared and passed through the prepared columns at room temperature. The solutions were pumped through the columns at flow rates that allowed approximately one minute of contact time between the contaminant solutions and the adsorbent medium. The overall porosity of the packed beds was approximately 0.33, accordingly, the empty bed detention time was about 3 minutes. Effluent samples were collected at various times after flow through the columns was begun. These samples were analyzed for metal concentrations with an inductively coupled plasma emission spectrometer. The samples were analyzed for natural organic matter concentration, based on the commonly accepted assumption that the natural organic matter concentration is proportional to the solution's absorbence of ultraviolet light of wavelength 254 nanometers. The removal efficiencies of the adsorbent media were evaluated by calculating a breakthrough percentage. Breakthrough percentage was calculated by multiplying the ratio of contaminant concentration in the effluent to contaminant concentration in the influent by 100.

FIG. 1 provides a comparison of the removal efficiencies of the iron-oxide-coated sands of Example 1 and Example 2 for three solutions containing different contaminants, chromate, copper, and natural organic matter (NOM). The copper used in these tests was complexed with ammonia in order to maintain it in a soluble form. Thus, all three contaminants represented in FIG. 1 were completely dissolved. As can be seen from FIG. 1, the adsorbent medium prepared according to Example 1 and Example 2 adsorbed copper at higher levels than chromate, and adsorbed chromate at higher levels than NOM.

Figure 15:
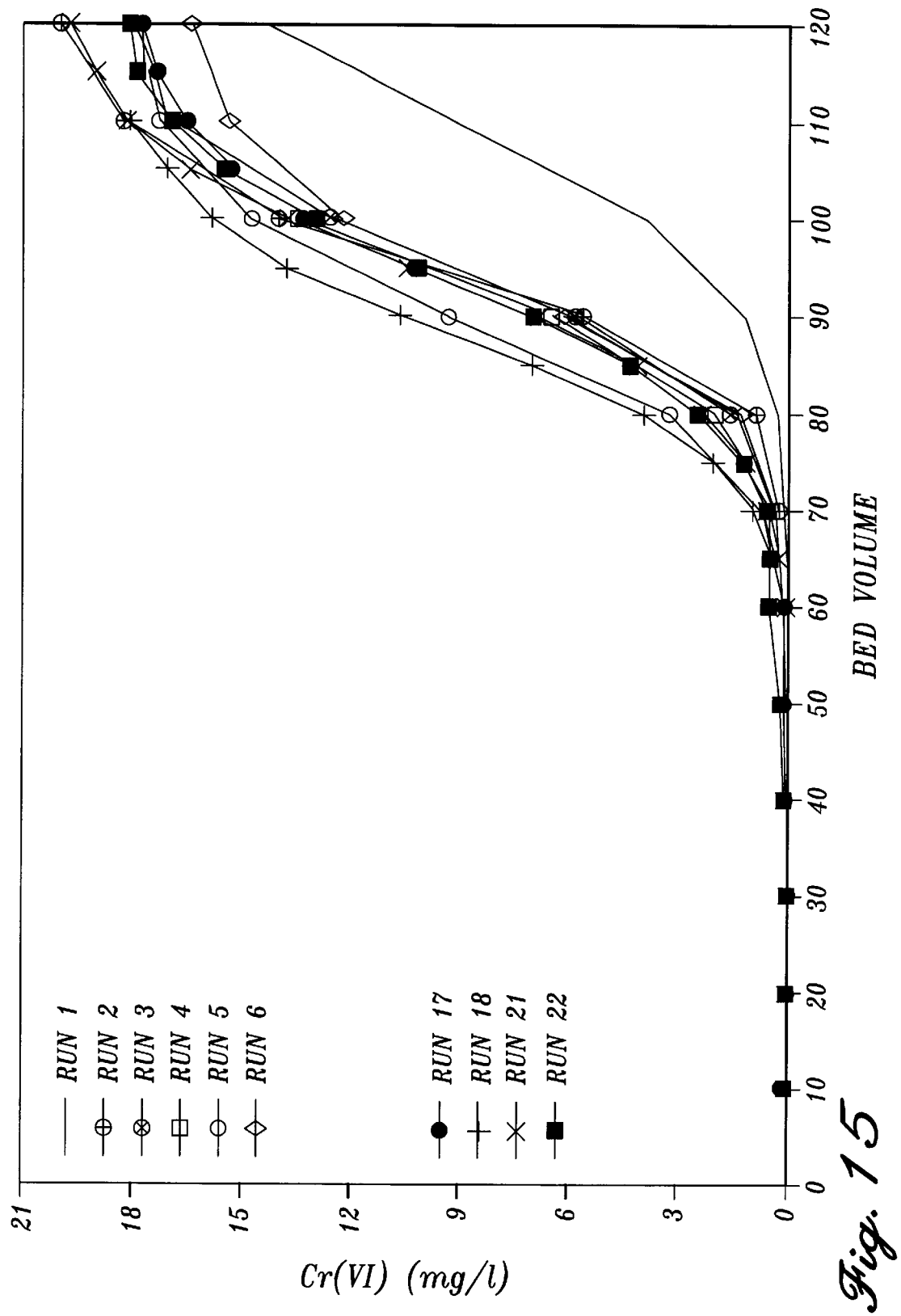
FIG. 15 is a graph of effluent concentrations of chromate in solution after passing over a column packed with adsorbent media prepared in accordance with the second aspect of the present invention and subjected to repeated cycles of adsorption and desorption.
Figure 16:
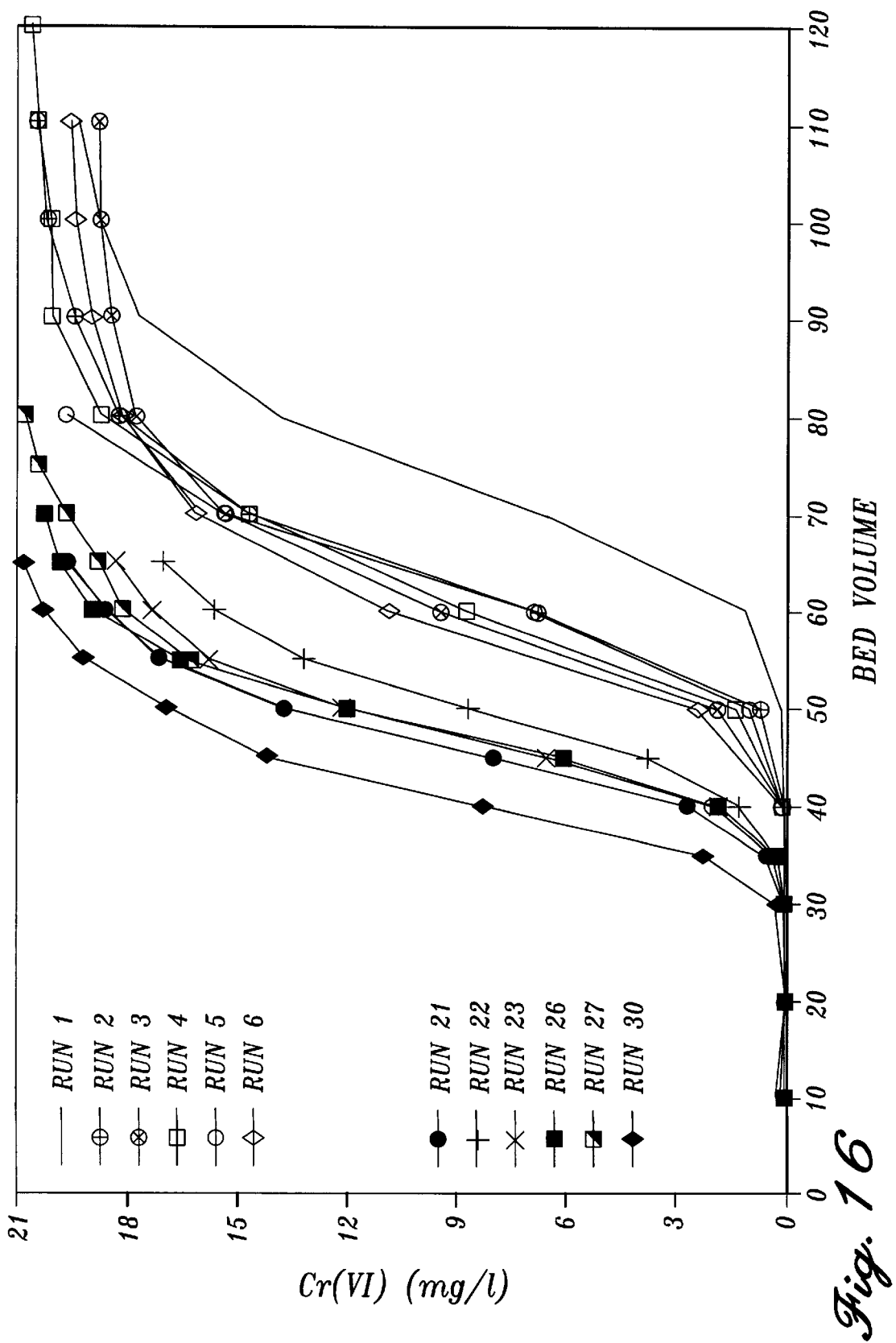
FIG. 16 is a graph of effluent concentrations of chromate in solution after passing over a column packed with adsorbent media prepared in accordance with the first aspect of the present invention and subjected to multiple adsorption and desorption cycles.

When the adsorbent media from Example 1 and Example 2 were regenerated by exposure to strongly basic solutions after sorption of chromate, the performance deteriorated steadily over sequential adsorption/desorption cycles. This deterioration appears to be attributable to some gradual transformation of the iron oxide surface when it is exposed to the alkaline solution in the regeneration step. Referring to FIG. 15, wherein the number of adsorption/desorption cycles increases with the increasing number of the run, the deterioration of the ferric chloride coated sand slowed and eventually stopped after several regeneration cycles. Referring to FIG. 16, wherein the number of adsorption/desorption cycles increases with the increasing number of the run, the deterioration of the adsorbent medium prepared according to Example 1 was more severe than that prepared according to Example 2. No such deterioration was observed in sequential runs to adsorb copper, in which case the regeneration is conducted at acidic pH values.

Figure 2:
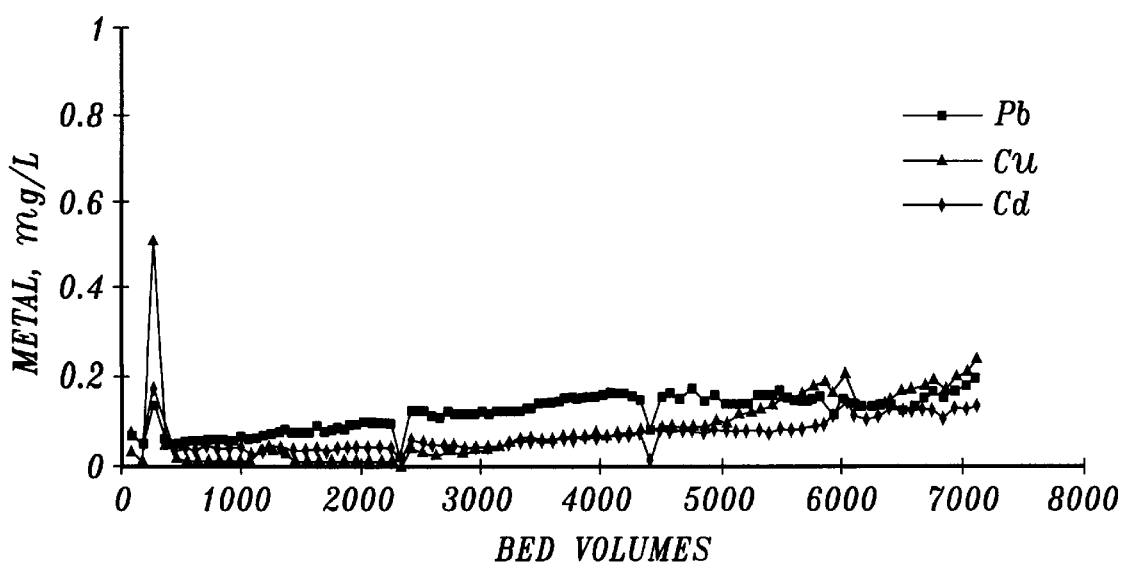
FIG. 2 is a graph of effluent metal concentrations in a solution containing lead, cadmium, and copper entirely in soluble form after passing through a column packed with iron-oxide-coated sand prepared in accordance with a second embodiment of the present invention.

FIG. 2 provides a comparison of the removal efficiencies of the iron-oxide coated sand of Example 2 in a packed column (prepared as described above) for three different contaminants of copper, lead, and cadmium from solutions containing 0.5 mg/liter of each metal in soluble form. Solution pH was 9.0. Metal concentrations were determined by sampling the effluent at periodic intervals and analyzing the samples with an inductively coupled plasma emission spectrometer. FIG. 2 shows that the adsorbent medium adsorbed 70 to >90% of the copper, lead, and cadmium from solution. The performance of the adsorbent medium over several adsorption/desorption cycles was consistent.

Figure 4:
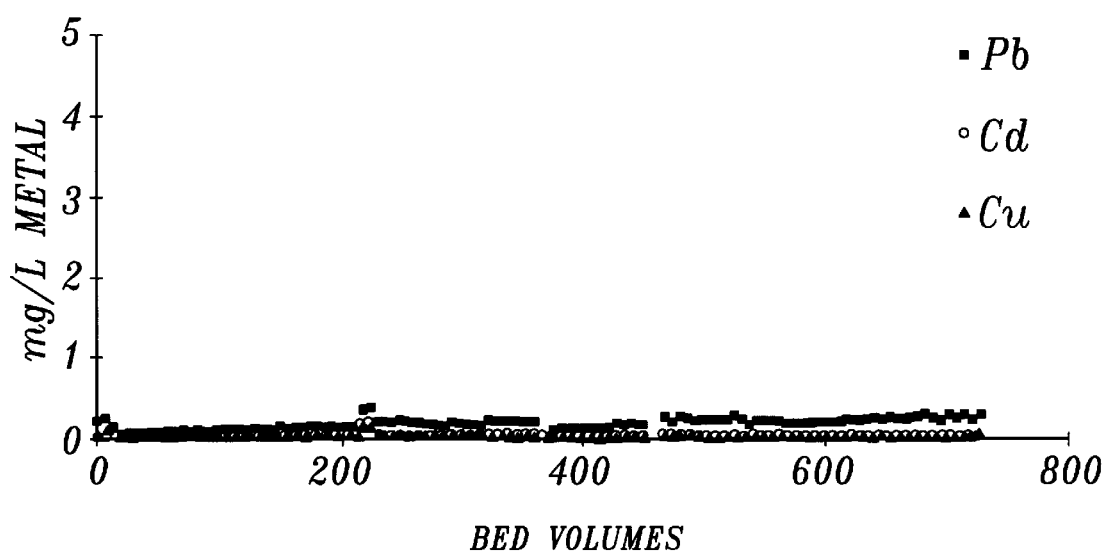
FIG. 4 is a graph of effluent metal concentrations in a solution containing lead, cadmium and copper distributed between soluble and particulate form after passing over a column packed with iron-oxide-coated sand prepared in accordance with the second embodiment of the present invention.

A solution containing 5.0 mg/liter of copper, lead, and cadmium distributed between soluble and particulate forms was passed over the adsorbent medium prepared according to Example 2 and packed into a Plexiglas tube as described above. Solution pH was 9.0. The absorbent medium removed particulate metal contaminants simultaneously with dissolved contaminants, as shown in FIG. 4. As illustrated by FIGS. 2 and 4, the removal efficiencies for dissolved Cu, Pb, and Cd were greater than 70, 80, and 90 percent, respectively, and the removal efficiency for particulate forms of all three metals was greater than 95%. The adsorbent medium removed both forms of contaminants and remained stable through numerous cycles in which it was backwashed (exposed to high shear conditions) and regenerated (exposed to relatively acidic (pH 2.0) conditions).

Figure 3:
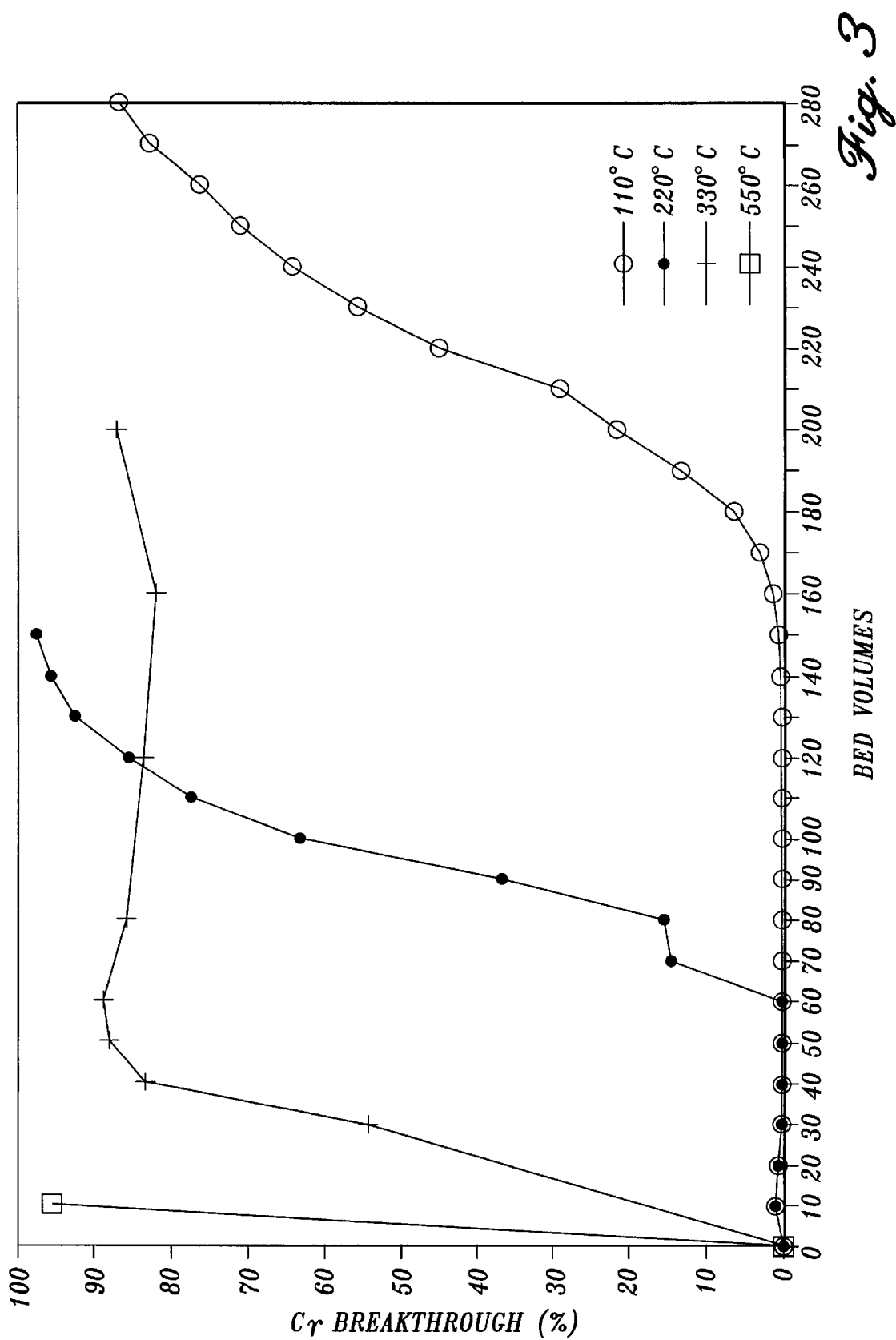
FIG. 3 graphically illustrates the effect of drying temperature on performance of iron-oxide-coated sand prepared in accordance with the first embodiment of the present invention.

To evaluate the effect of heating temperature on the performance of iron coated sand prepared according to the first aspect of the present invention, separate batches of iron coated sand were prepared in accordance with Example 1 with the exception that the temperature of drying was 220° C., 330° C., and 550° C., respectively. Samples of the adsorbent medium were packed into Plexiglas tubes as described above. Solutions containing an influent amount of chromate were passed through the columns and samples of the effluent were collected at periodic intervals and analyzed for chromate concentration as described above. Chromate breakthrough percentages were calculated as described above. FIG. 3 shows that increasing the drying temperature has a negative effect on the ability of the adsorbent medium to adsorb dissolved chromate ions.

Examples 1 and 2 yield products that are useful for reversibly adsorbing dissolved metal ions and for filtering particulate matter, including insoluble metal salts, from water. They can be backwashed with negligible loss of the coating from the surface. The products from Examples 1 and 2 are less effective at adsorbing natural organic matter from a drinking water source.

Comparative Example
(Effect of elevated heating on medium of Example 2)

Figure 9:
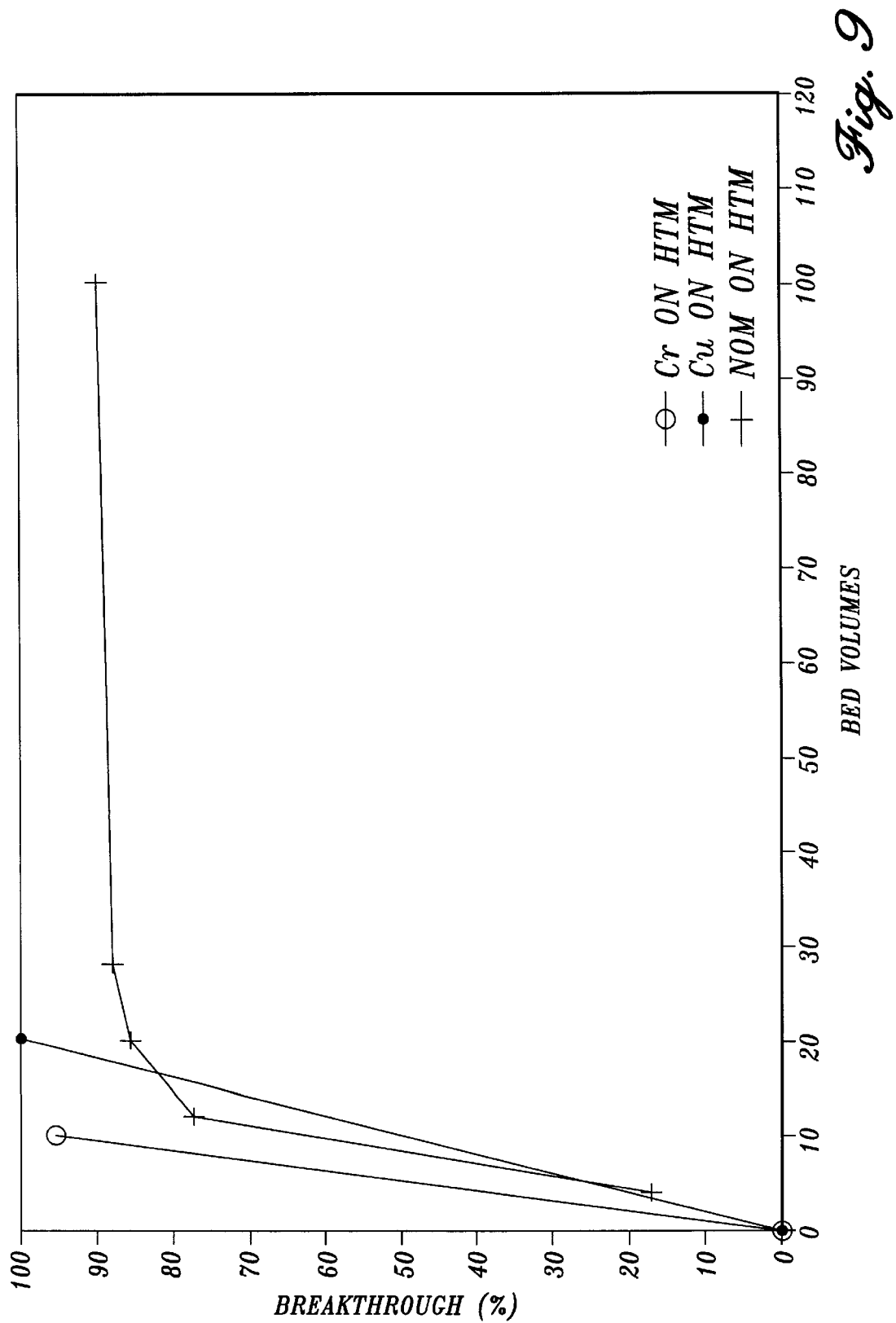
FIG. 9 is a graph of effluent concentration in a solution containing copper, chromate, or natural organic matter (NOM) after passing over columns packed with iron-oxide-coated sand prepared at 550° C.

The next set of experiments used an adsorbent medium that was prepared by heating the ferric chloride coated sand prepared in Example 2 to 550° C. (high temperature medium, or HTM). Whereas the processes described above in Example 2 yielded coatings that were stable under normal chemical conditions but could be dissolved rapidly (within a few minutes) by exposure to concentrated acids at room temperature, the coating prepared at 550° C. could be dissolved only by prolonged (several hours) exposure to boiling in concentrated acid. The medium prepared according to this comparative example had a much more positive surface charge than plain sand. For comparison with the medium described in FIG. 6 below, the medium of this comparative example was tested for its ability to adsorb copper and chromate as well as NOM. Referring to FIG. 9, it can be seen that the medium had a very low affinity for any of the contaminants tested (cations, anions, or NOM).

It was determined that the surface area of the HTM was considerably lower than that of the ferric chloride coated medium prepared according to Example 2. The HTM was then coated using the procedure for applying ferric chloride coatings described in Example 2. The performance of the resulting media was virtually indistinguishable from that of the media prepared according to Example 2.

Example 3
(Ferric chloride and hydroxyl in solution)

A solution containing approximately 0.37 moles $FeCl_3$ (100 grams $FeCl_3 \cdot 6H_2O$) per 100 ml of deionized water was prepared. Following complete dissolution of the $FeCl_3 \cdot 6H_2O$, an amount of base equivalent to approximately 2.5 moles OH ions per Fe ion in the solution (e.g., 185 ml of 10M NaOH, for the amounts of $FeCl_3 \cdot 6H_2O$ and water specified above) was added to the solution. The mixture was stirred for approximately 30 minutes and then heated at 110° C. until the water content of the remaining paste was approximately 45 to 55 percent by weight.

During heating, a salt crust formed on top of the paste. This crust was scraped off and discarded. After the paste cooled, it was mixed with Ottawa sand (described above in Example 1) in a ratio of approximately 100 grams of paste to 1,000 grams of sand. The mixture was thoroughly mixed until all sand grains appeared to be evenly coated. The mixture was then dried at 110° C., broken up, and sieved.

Plexiglas tubes were packed with the adsorbent medium prepared as described above. Solutions containing influent amounts of contaminants chromate, copper, and natural organic matter were prepared and pumped through the columns as described above. Samples of the effluent were collected at periodic intervals and analyzed for metal content and natural organic matter content. Breakthrough percentages were calculated as described above.

Figure 5:
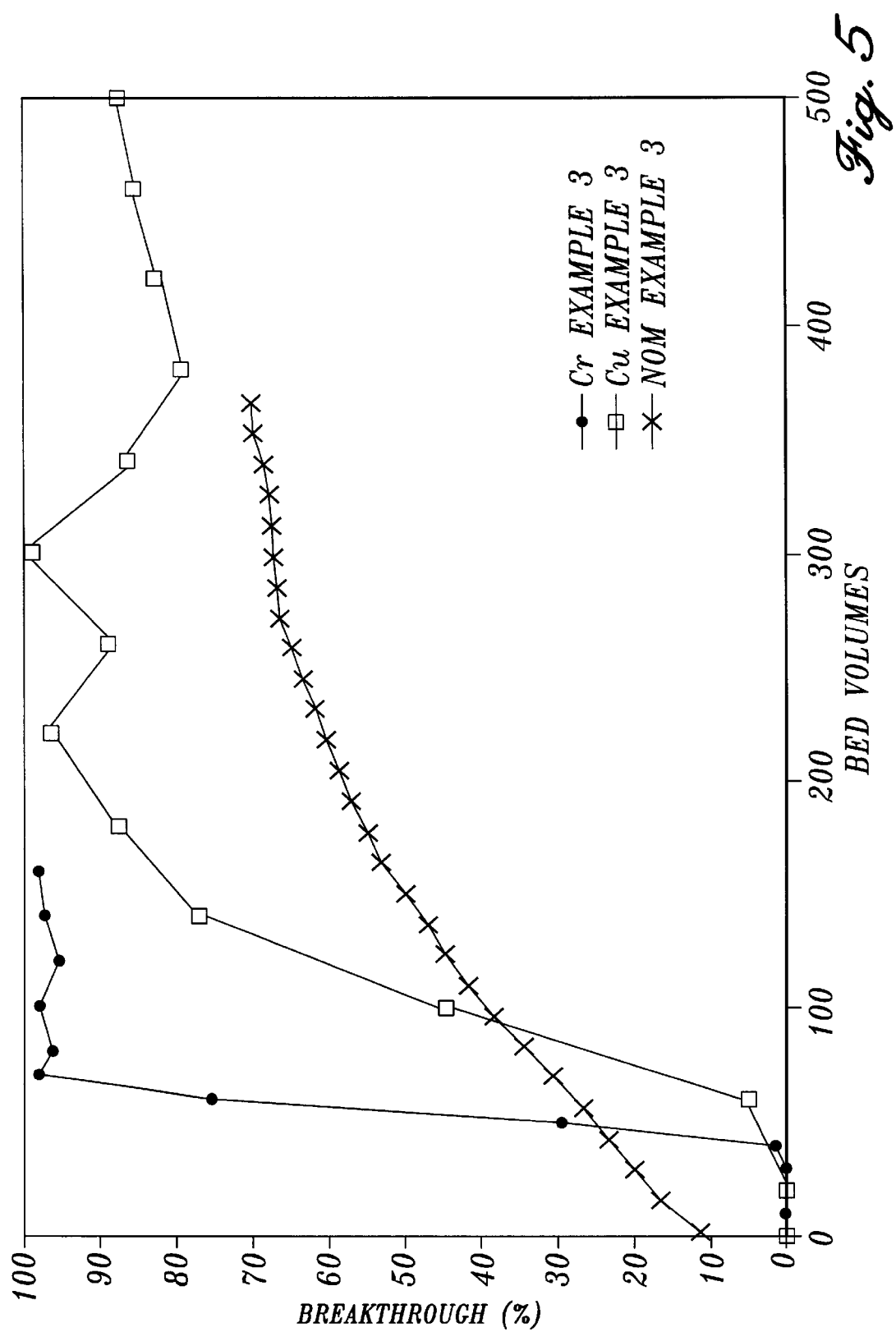
FIG. 5 is a graph of effluent concentrations in a solution of copper, chromate, or natural organic matter (NOM) after passing over a column packed with iron-oxide-coated sand prepared in accordance with a third embodiment of the present invention.
Figure 6:
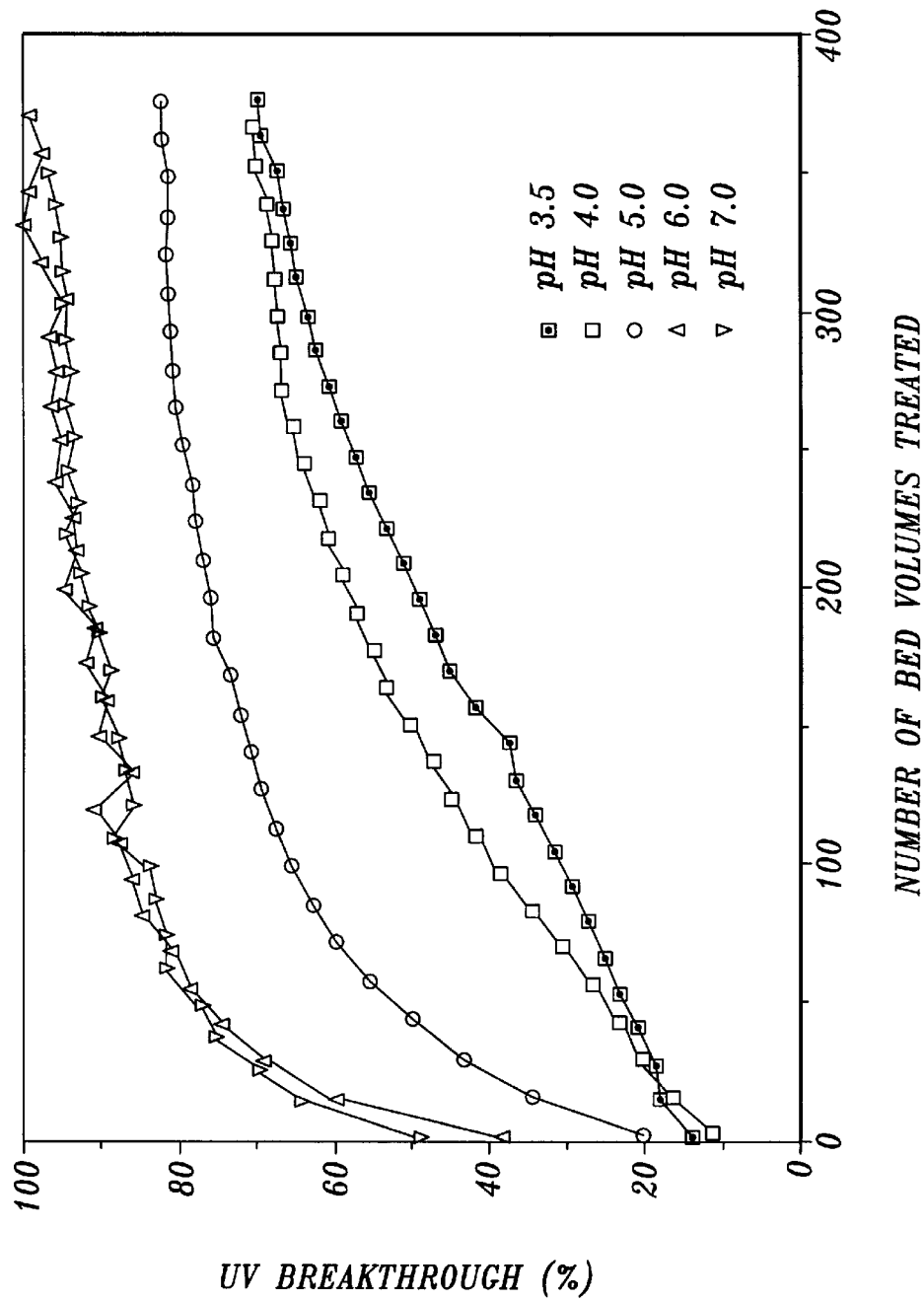
FIG. 6 is a graph which illustrates the effect of solution pH on sorption of NOM by an adsorbent medium prepared in accordance with the third embodiment of the present invention.
Figure 7:
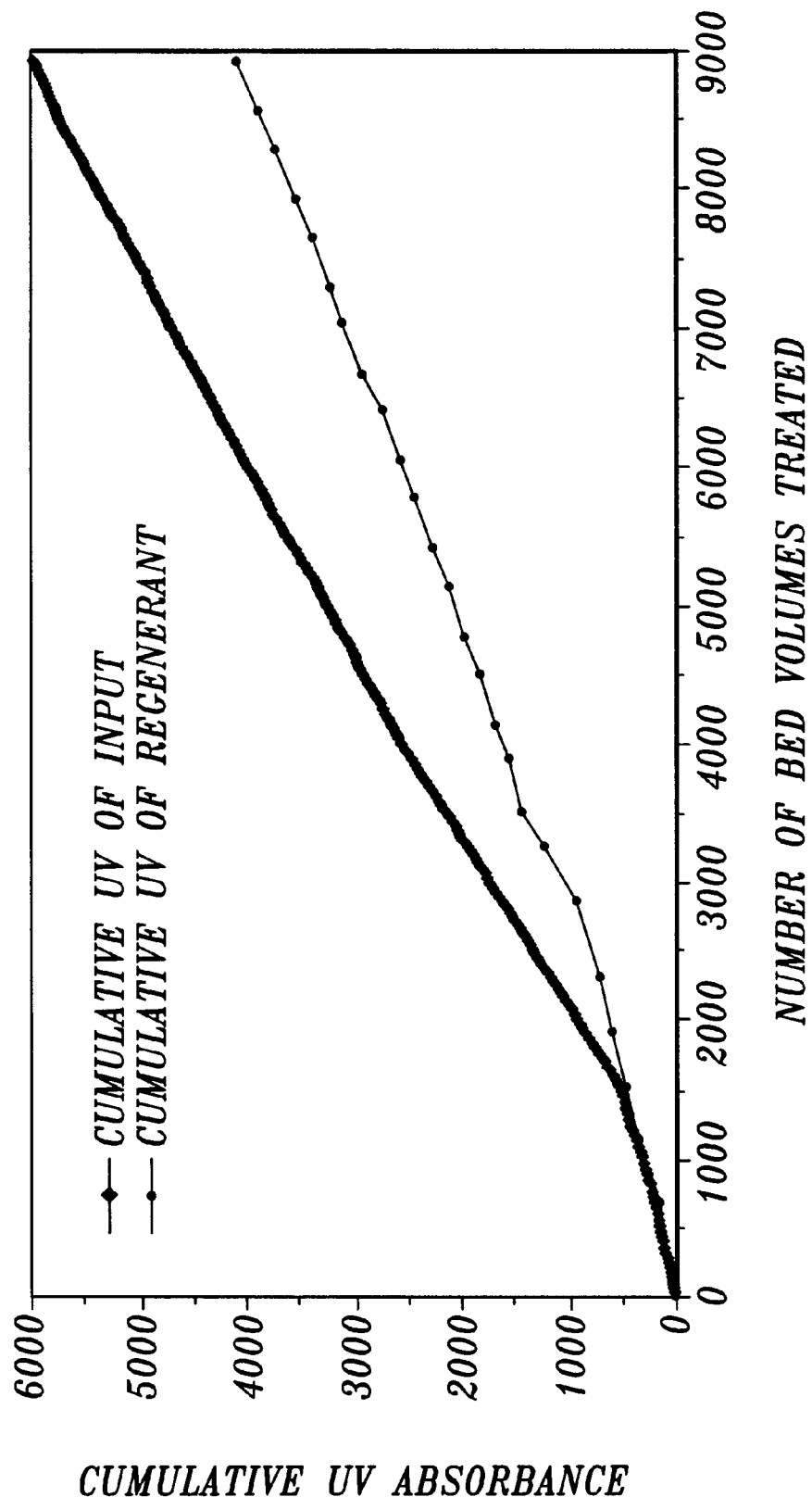
FIG. 7 graphically represents removal of NOM in a pilot unit packed with adsorbent medium prepared in accordance with the third embodiment of the present invention, at a water treatment plant in Washington State.

The performance of the medium prepared in accordance with Example 3 in tests to remove NOM from an artificial drinking water (made by adding NOM from a local lake to pure water) is shown in FIGS. 5, 6, and 7. FIG. 5 shows the ability of the adsorbent medium to adsorb NOM, copper, and chromate, for purposes of comparison with the prior figures. FIG. 5 illustrates that the adsorbent medium prepared according to Example 3 adsorbs NOM in greater amounts than it adsorbs either copper or chromate. Comparing the results illustrated in FIG. 5 with those illustrated in FIG. 1 indicates that the adsorbent medium prepared according to Example 3 is a better adsorbent for NOM than the adsorbent media prepared according to Examples 1 and 2.

FIG. 6 shows that the performance of the adsorbent medium of Example 3 improves considerably as the solution pH is lowered from around 7 to around 4. Although the tests described above represent a potentially valuable breakthrough in the treatment of natural drinking waters, the result presented above will limit the conditions under which the medium is likely to be employed. This limitation is that most drinking water utilities use source water that is in the pH range 6 to 8, and most utility managers would be unwilling to acidify the water to 4.0 in order to take advantage of the new medium's capabilities. Although some utilities use acidified water sources and others would be willing to lower the pH of their water temporarily in order to use the process, most would find the process requirements unacceptable.

FIG. 7 illustrates the performance results of the adsorbent medium of Example 3 in a pilot test unit deployed at the Skagit County Public Utility District Water Treatment Plant in Washington State. The upper line represents the cumulative input of ultraviolet absorbing substances (corresponding to the amount of natural organics) to the pilot unit. The lower line represents the cumulative amount of such substances removed by the treatment and recovered in the regenerant solution. Each data point on the lower line indicates a regeneration step. Overall, about 70% of the organics in the influent were removed and recovered in the regenerant solution. In particular, FIG. 7 shows that the adsorbent medium prepared according to Example 3 performs consistently throughout several cycles where it is regenerated on-site using 0.5M NaOH as a regenerant.

Example 4
(Iron-Oxide-Coated Medium Prepared Using Particles Other Than Sand)

In an attempt to expand pH range over which the treatment process might be used, the performance of several other granular media to which iron oxide coatings might be applied was investigated. The types of media that were tested with this process contained magnesium. These media include magnesium oxide (MgO), dolomite (calcium magnesium carbonate, $CaMg(CO_3)_2$), and olivine (magnesium-iron silicate, $(Mg,Fe)_2SiO_4$). In each case, the medium was prepared using three or four variations. One was use of the medium without an iron oxide coating to determine whether any of the medium might be useful in its native form. The second was use of the medium coated in one step using the ferric chloride solution, i.e., the preparation that was successful for removing metals from water when plain sand was the core material, as described in Example 2. The prepared media were packed into Plexiglas tubes as described above. Solutions containing NOM were passed over the columns. Effluent samples were collected and analyzed as described above. For all the minerals, the removal of NOM by the media prepared in either of these ways was very poor, and the preparation was judged unacceptable for NOM removal.

Figure 8:
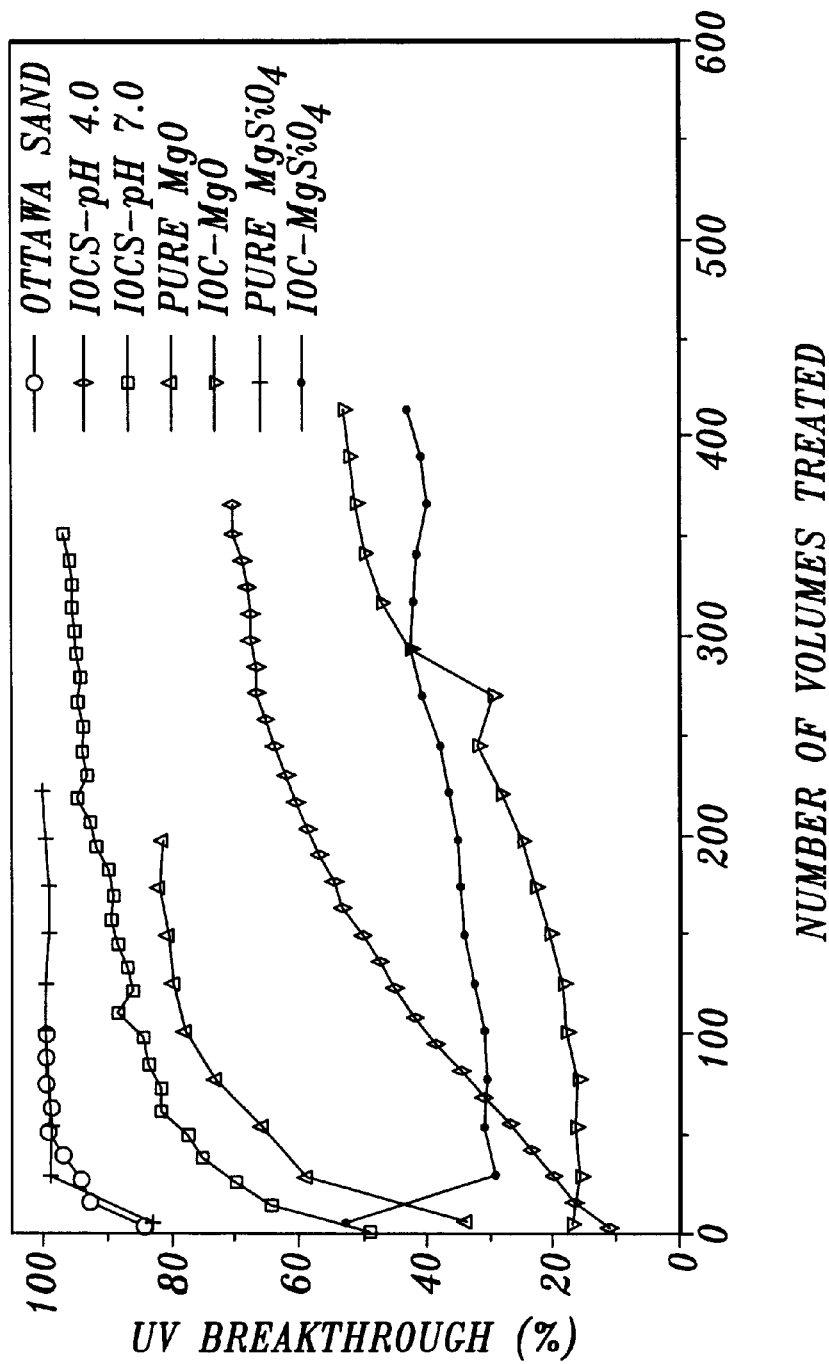
FIG. 8 is a graph of effluent NOM concentration of a solution containing NOM after passing over columns packed with various iron-oxide-coated medium prepared in accordance with the present invention.

When these media were coated using the two-step method described in Example 3 and evaluated by passing contaminant solutions over them in packed Plexiglas tubes as described below, all of the media performed better than the uncoated media or the medium prepared according to Example 2, and in fact better than when sand was the core mineral. A comparison of the various media is shown in FIG. 8. The natural organic matter pumped through the columns of Plexiglas in the experiments that are depicted in FIG. 8 was collected from a natural lake, filtered, and then diluted with distilled water to replicate natural organic matter concentrations typically found in drinking water sources. The flow rate through the columns was such that the contact time was about 1.7 minutes, corresponding to an empty bed contact time of 5 minutes. Samples of the influent and effluent were analyzed for the absorbence of ultraviolet light at 254 nanometers. Breakthrough was computed as described above, using the ultraviolet absorbence as the measure of "contaminant concentration." FIG. 8 indicates that the magnesium/iron-containing minerals, when coated, perform as well at pH 7 as does the coated sand at pH 4. Since pH is a logarithmic scale, this result indicates that the coated, magnesium/iron-containing minerals have approximately 1,000 times as great a selectivity for the NOM over OH ions as does the coated sand.

Despite the encouraging result shown in FIG. 8, not all of the preparations shown are good candidates for application in drinking water treatment. The magnesium oxide and dolomite, even when coated, dissolved at rates that are too high to allow them to be used economically in many systems, although there may be water systems where this limitation is not absolute. Attempts were made to impede the dissolution rate by coating the minerals using the standard ferric chloride solution, prior to coating them using the two-step process. In colloquial language, this might be thought of as applying a 'primer' coat to the minerals. Even though the primer coat appeared to cover the minerals completely, the dissolution rates remained quite high.

Example 5
(Abrasion resistance of olivine based adsorbent media)

Support material of sand having particle diameters of 0.7 and 0.4 millimeters and olivine having particle diameters of 0.7 and 0.46 was coated with iron according to the method of Example 3. All of the sand support material samples were subjected to 3 coating cycles with one exception, which was subjected to 5 coating cycles. In an attempt to increase the strength of the iron-to-surface bond, batch Nos. S-116, S-504, and S-226 were subjected to a mild and short backwashing step with deionized water between coating cycles. The mild backwashing was accomplished by flowing deionized water through a bed of the particles for 10 minutes at a rate sufficient to expand the bed 100%. The olivine support material samples were subjected to either 3 or 5 coating cycles. The olivine samples were also subjected to a mild and short backwashing step with deionized water between coating cycles as described above. Each of the adsorbent medium samples was packed into separate Plexiglas tubes. The tubes were backwashed using deionized water at a velocity sufficient to expand the bed 100 percent. The effluent from the backwashed tubes at ten minutes was collected and analyzed for iron content. Samples of the effluent were taken at periodic intervals. The effluent samples were analyzed for iron content. The results are set forth in Table 1 below.

comparable size. This suggests that coated olivine could be used as a combination filter and adsorber in treatment plants operating under conventional conditions, which is not the case for the coated sand. The data in Table 1 also shows that for media coated in the same way, the gross amount of iron that associates with olivine is substantially greater than the corresponding amount that associates with sand.

Example 6

(Removal of DBPs using iron oxide coated olivine under slow filtration conditions).

In order to investigate the performance of iron oxide coated olivine (IOCO) as a filter medium in a slow filtration process for treating surface water, iron oxide coated olivine was prepared according to the method described in Example 1 using olivine as the substrate. More specifically, a mixture of 2.7 millimeters of 10N sodium hydroxide and 360 millimeters of a 2.06M iron nitrate solution was poured over 600 millimeters of olivine in a 23 cm×33 cm heat resistant glass baking dish. The uncoated olivine was supplied by AIMCOR (Bellingham, Wash.) and was washed and sieved to provide an effective grain size ($D_{10}$) of about 0.29

TABLE 1

Iron Loss from Surfaces of Coated Media During Backwashing

| Media Batch | Number of Coating Cycles | Media Diam. (mm) | Backwashing Period | | | | | | Iron Loss[4] (%) |
|---|---|---|---|---|---|---|---|---|---|
| | | | 10 min | 1 hr | 3 hr | 1 day | 3 day | 7 day | |
| Coated Sand | | | | | | | | | |
| S-99[1] | 3 | 0.7 | 1.44[3] | — | — | 0.054 | 0.045 | — | 97.9 |
| S-115[1] | 3 | 0.7 | 2.78 | 1.49 | 1.22 | — | 0.17 | — | 93.9 |
| S-116[2] | 3 | 0.7 | 3.02 | 2.75 | 2.35 | — | 0.67 | — | 77.8 |
| S-504[2] | 3 | 0.4 | 2.90 | — | — | — | — | 2.83 | 2.4 |
| S-226[2] | 5 | 0.4 | 5.2 | — | — | — | 5.1 | — | 1.7 |
| Coated Olivine | | | | | | | | | |
| O-2[2] | 3 | 0.7 | 7.50 | — | — | 6.30 | — | — | 15.8 |
| O-1[2] | 3 | 0.46 | 6.66 | — | — | 6.16 | — | — | 7.5 |
| O-1[2] | 5 | 0.46 | 6.98 | — | — | 6.81 | — | — | 2.3 |

[1]Not backwashed between coating cycles
[2]Backwashed between successive coating cycles
[3]Values are weight percent Fe on coated medium
[4]Iron loss comparing final value to value after 10 minutes backwashing Table 1 shows that batches of larger sand (e.g., 0.7 millimeter diameter) lost at least three-quarters of the iron from their surface within three days. The one batch (i.e., S-99) that was tested after one day of backwashing lost over 95% of the iron from its surface within that one day. By contrast, the comparable size of coated olivine (i.e., batch O-2) lost less than one-sixth of the iron from its surface during one day of backwashing. The smaller size grains of either coated media (coated sand or coated olivine designated batch Nos. S-504, S-226, O-1, and O-1 five cycles) lost less than 10% of the iron from their surfaces during backwashing. The smaller size grains of coated sand lost slightly less iron than the smaller size grains of coated olivine. This difference might reflect the fact that the average diameter of the smaller grains of sand was slightly less than the average diameter of the smaller grains of olivine. Based on these tests, the coated olivine grains of a size typically used in water filtration processes retain much more iron during the backwashing process than coated sand grains of millimeters with a 1.9 uniformity coefficient ($D_{60}/D_{10}$). The mixture was then heated in an oven at 110° C. for 14 hours. The coated olivine grains were then rinsed for 10 to 12 hours with deionized water to remove unattached iron particles.

Three sample filters were prepared by packing 24 inches of granular filtration medium into six inch diameter polyvinylchloride columns. Each column utilized the same underdrain and support gravel system that comprised graded gravel sized in accordance with standard design guidelines for slow sand filtration (Hendrick, D., Manual of Design for Slow Sand Filtration, Denver, Colo., AWWARF, 1991). In addition to the IOCO, the filter medium tested included Steilacoom sand ($D_{10}$ equals 0.3 millimeters, $D_{60}/D_{10}$ equals 2.0), uncoated olivine minerals ($D_{10}$ equals 0.29 millimeters, $D_{60}/D_{10}$ equals 1.9), and IOCO. The IOCO had the same size and uniformity as the uncoated olivine minerals described above.

The filters were each used to evaluate two different source waters. The first source water was collected from the Cle Elum River near Cle Elum, Wash., and operated for approximately six months. Each filter was operated at an average filter loading rate of about 0.2 meters per hour or 0.66 ft. per hour (0.08 gallons/minute·ft$^2$). This loading corresponds to approximately eight empty bed volumes per day; therefore, a total of 1,480 empty bed volumes of influent were treated during the test. The turbidity of the effluent and the head loss were monitored five days per week and samples were collected every one to two weeks for laboratory analysis of UV absorbence and dissolved organic carbon. UV absorbence measurements were taken at 254 nanometers using a spectrophotometer and a 5 cm quartz cuvette. The pH of all samples was in the range of 6.8 to 7.3. Dissolved organic carbon (DOC) and total organic carbon (TOC) samples were analyzed in accordance with Standard Method 505C (Standard Methods for the Examination of Water and Wastewater. APHA, AWWA, and WEF, Washington, D.C. 16th ed. 1985), using an OI 700 Carbon Analyzer. Standards and blanks were run at the beginning and end of each sample set, and at intermediate points every 10 to 15 samples. Samples were filtered through a 0.45 micrometer prewashed membrane for DOC analysis. Samples for dissolved oxygen (DO) analysis were collected in 300 ml glass BOD bottles and analyzed in accordance with Standard Method 4500-OC Azide Modification.

Figure 17:
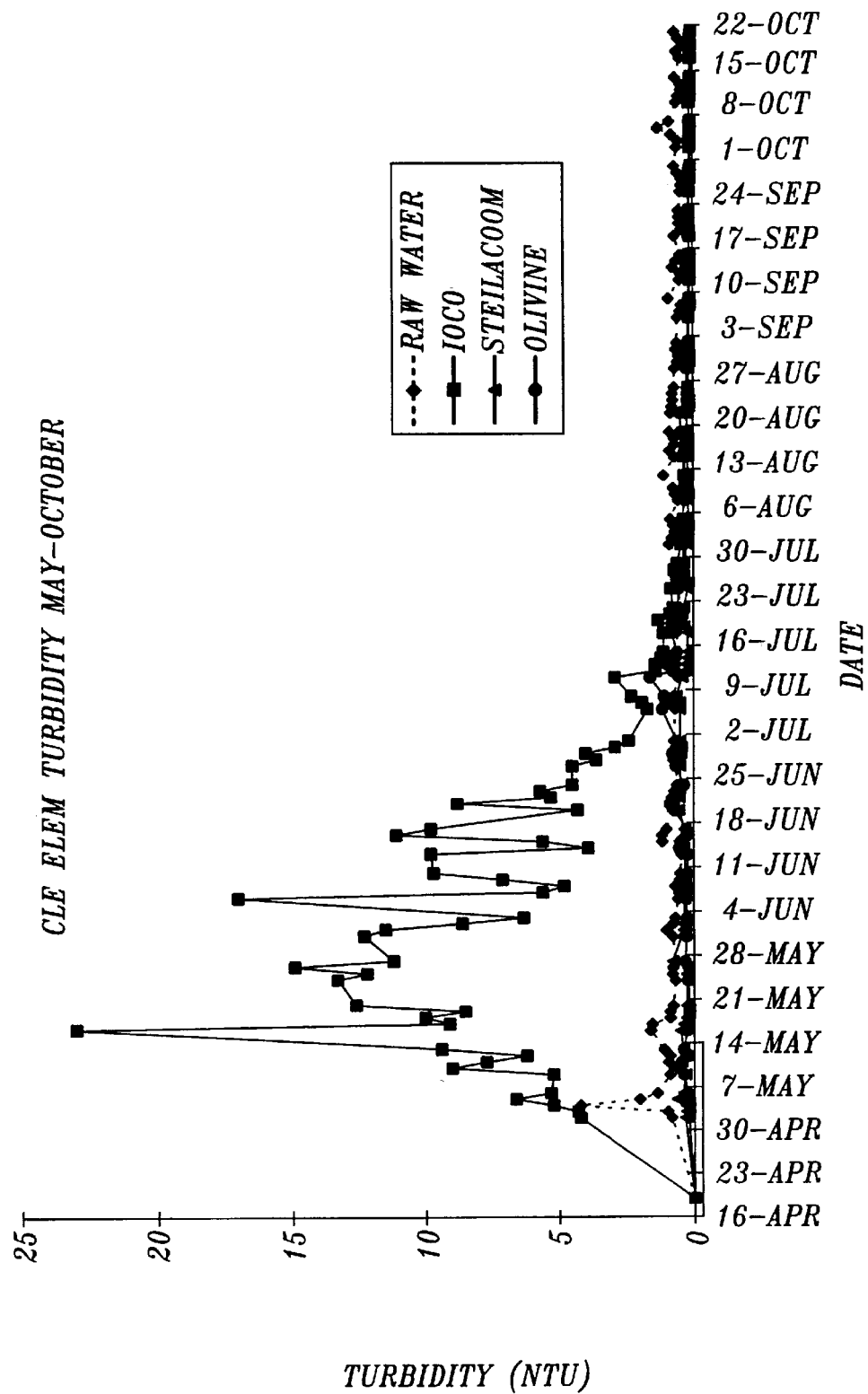
FIG. 17 is a graph of effluent turbidity for water from the Cle Elum River in Washington State treated in accordance with the present invention using an iron oxide coated mineral having an olivine structure, an uncoated mineral having an olivine structure, and Steilacoom sand.
Figure 18:
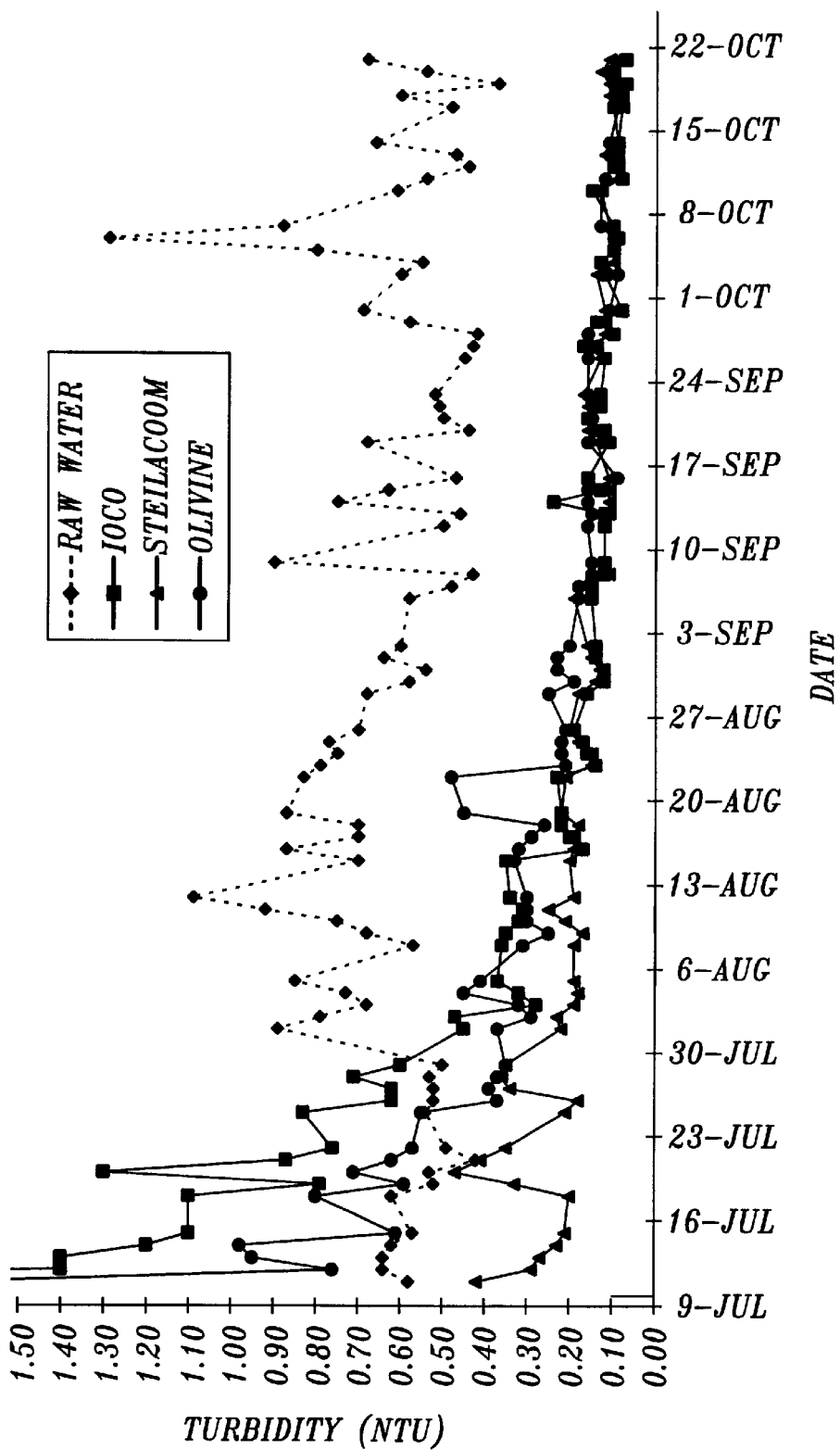
FIG. 18 is a duplicate of FIG. 17, with the x- and y-axes expanded.

FIG. 17 presents turbidity data from this example for the entire six month period. During the first few months of the period, iron shedding from the IOCO was responsible for high UV absorbence and turbidity in the water passing through the filter packed with IOCO. The data for the period after the shedding process had mitigated is shown in FIG. 18, using an expanded X- and Y-axis. During this latter portion of the test period, the IOCO provided turbidity removal comparable to or slightly superior to the Steilacoom sand and uncoated olivine minerals.

Figure 19:
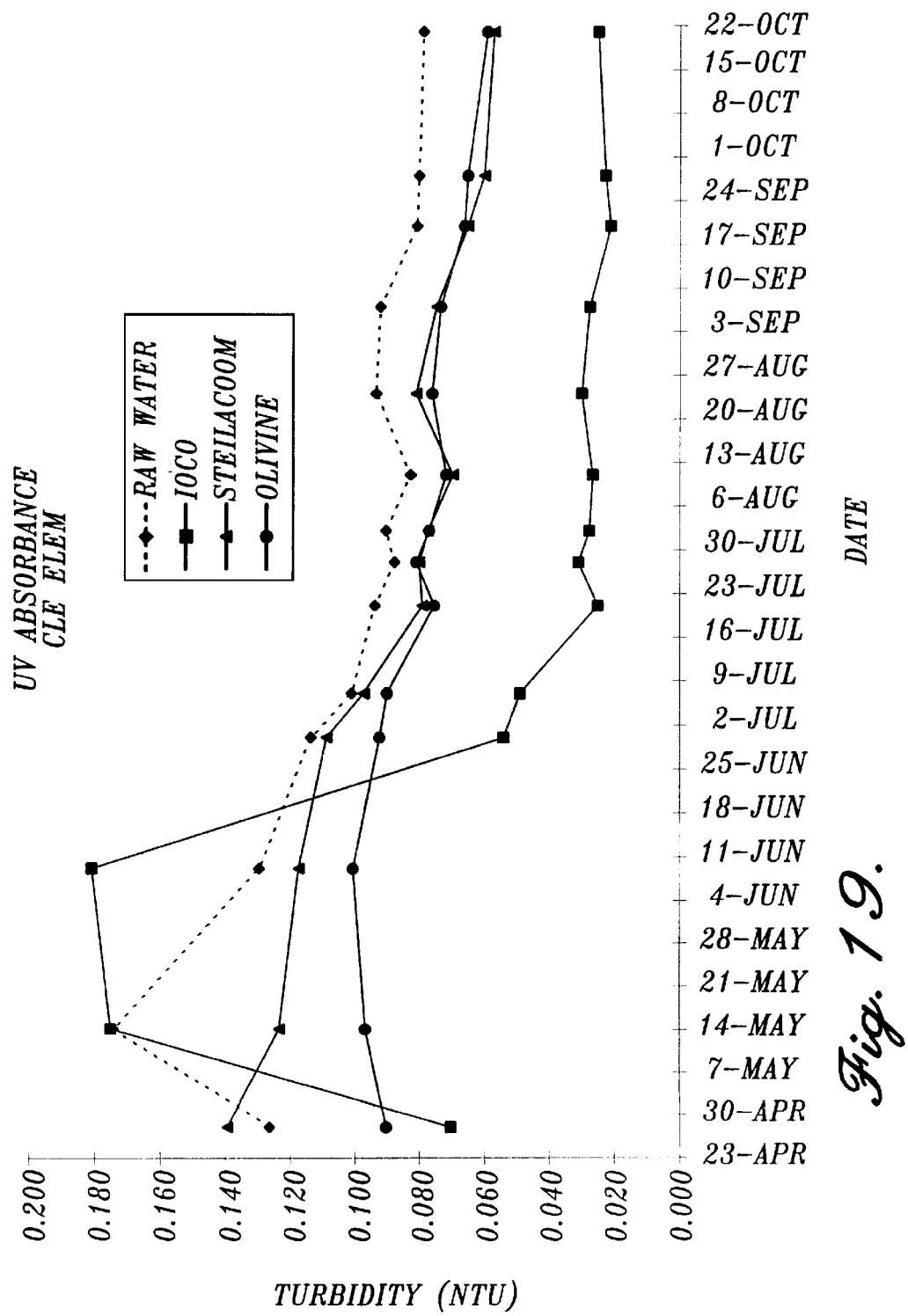
FIG. 19 is a graph of ultraviolet absorbence data at 254 nanometers for raw untreated water and for filtered water passed through each of the three test units described in Example 6.

FIG. 19 presents UV absorbence data at 254 nanometers for the raw water and for filtered water from each filter. Average removal of UV absorbence in the IOCO filter was about 70% for the last three months of the period, while the corresponding values for uncoated olivine minerals and Steilacoom sand were 17% and 18% respectively. Average removal of dissolved organic carbon (DOC) for the same period for IOCO was 32%, while it was 9% for uncoated olivine minerals and 12% for Steilacoom sand.

Figure 20:
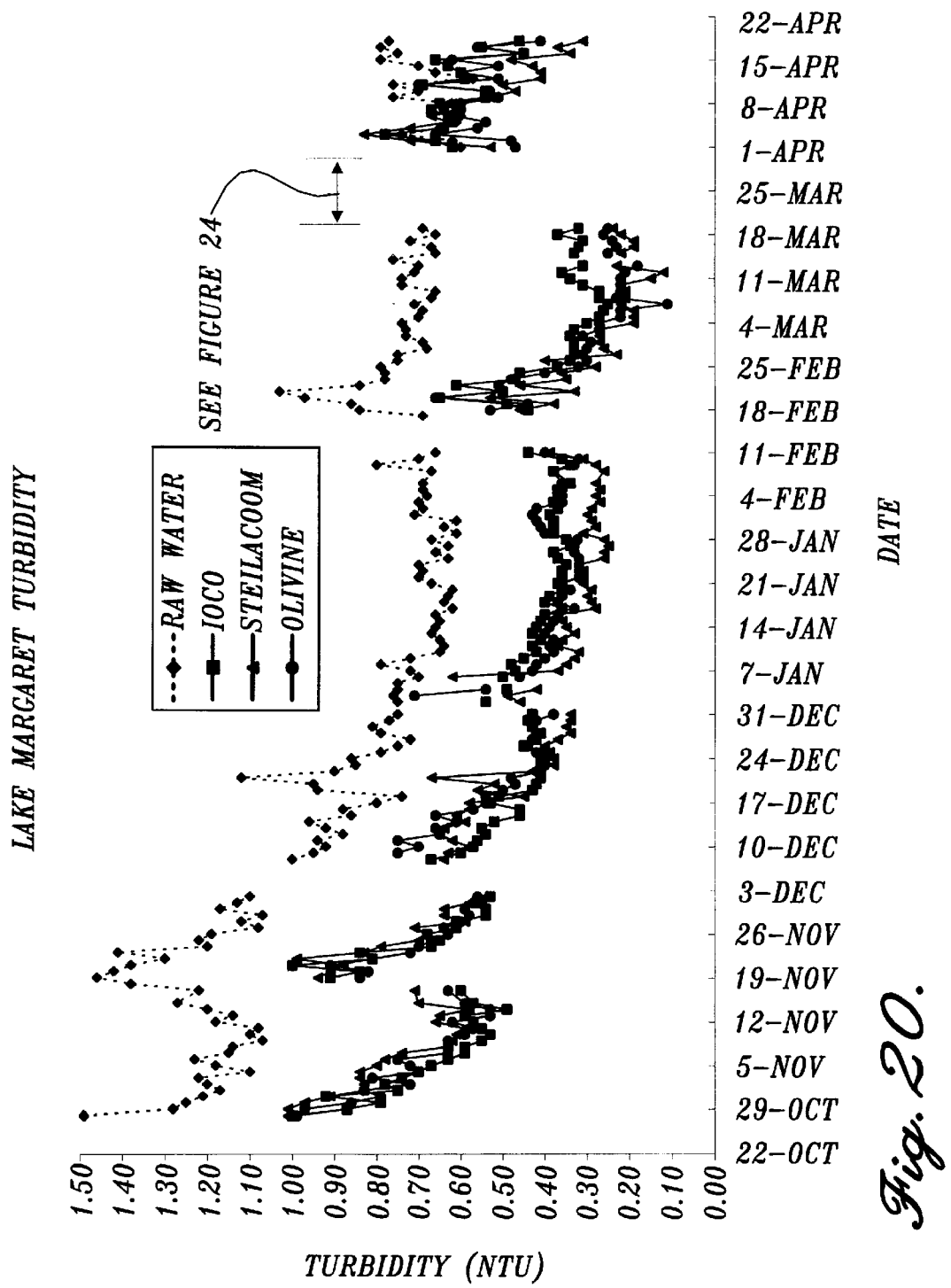
FIG. 20 is a graph showing the turbidity of another water source (Lake Margaret in Washington State) after passing through a bed of iron oxide coated mineral having an olivine structure, a bed of uncoated mineral having an olivine structure, and Steilacoom sand.

The second source of water was Lake Margaret, located in Northeastern King County, Wash. The DOC concentrations of the raw water in Lake Margaret during the test period ranged between about three and five milligrams per liter, and less than 0.2 mg/L particulate (>0.45 micrometer) organic carbon. The raw water pH was about 7.0. The filters were operated at a filter approach velocity of 0.43 ft/hour (0.05 gallon/minute·ft$^2$). FIG. 20 represents turbidity removal for each of the filtration medium evaluated. All three of the media provided comparable turbidity removal. The gaps in the respective data plots represent freezing of some of the piping during the test which interrupted the treatment and adversely affected turbidity removal for a short time.

On March 20, all three columns were exposed to a very high concentration of chlorine in order to kill all microorganisms in or on the media. The turbidity in all three columns was erratic for the following week, after which it stabilized at a value near that of the influent in all three columns.

Figure 21:
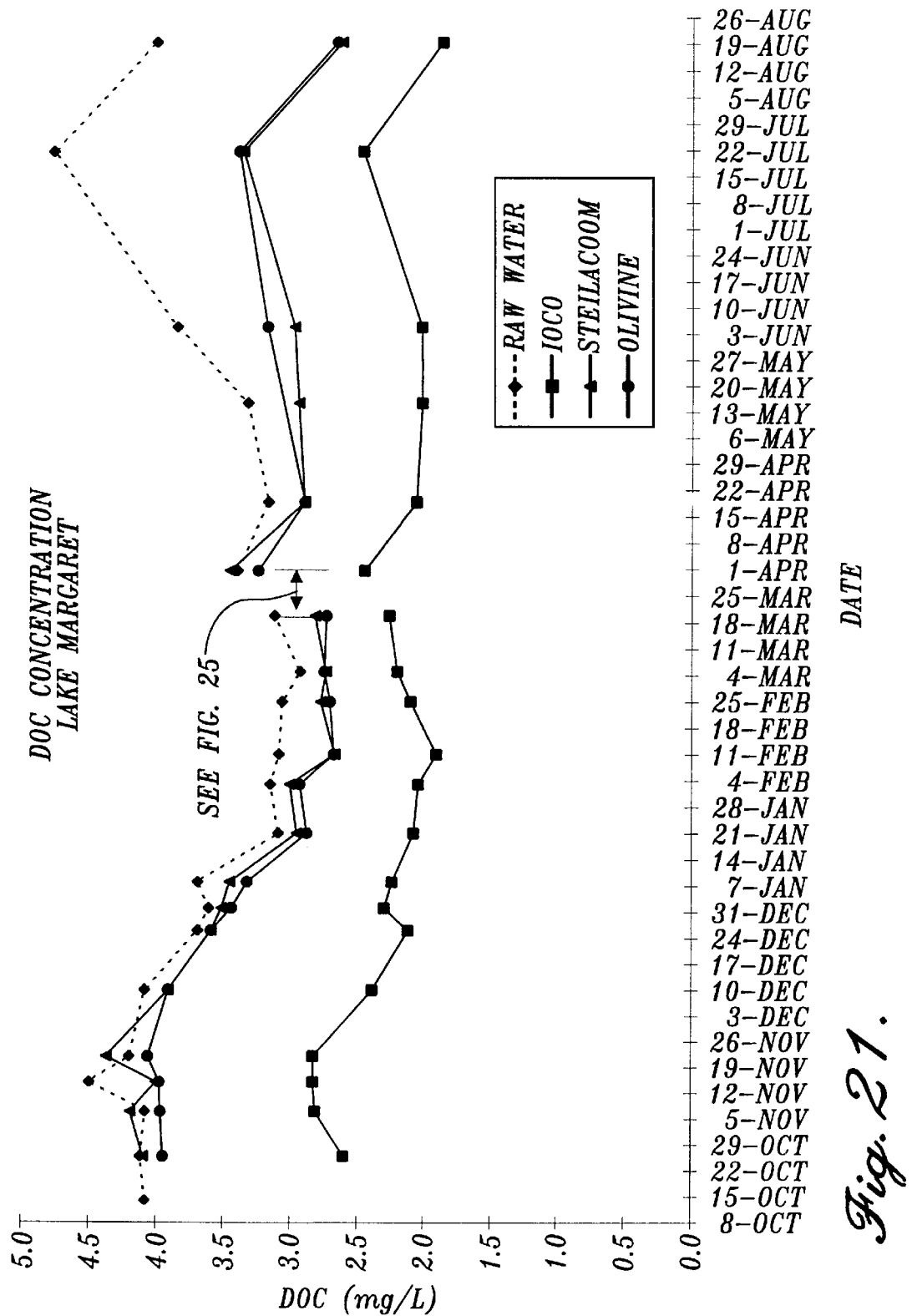
FIG. 21 is a graph of the dissolved organic carbon concentration of raw and filtered water from Lake Margaret for each of the three test beds described in Example 6.
Figure 22:
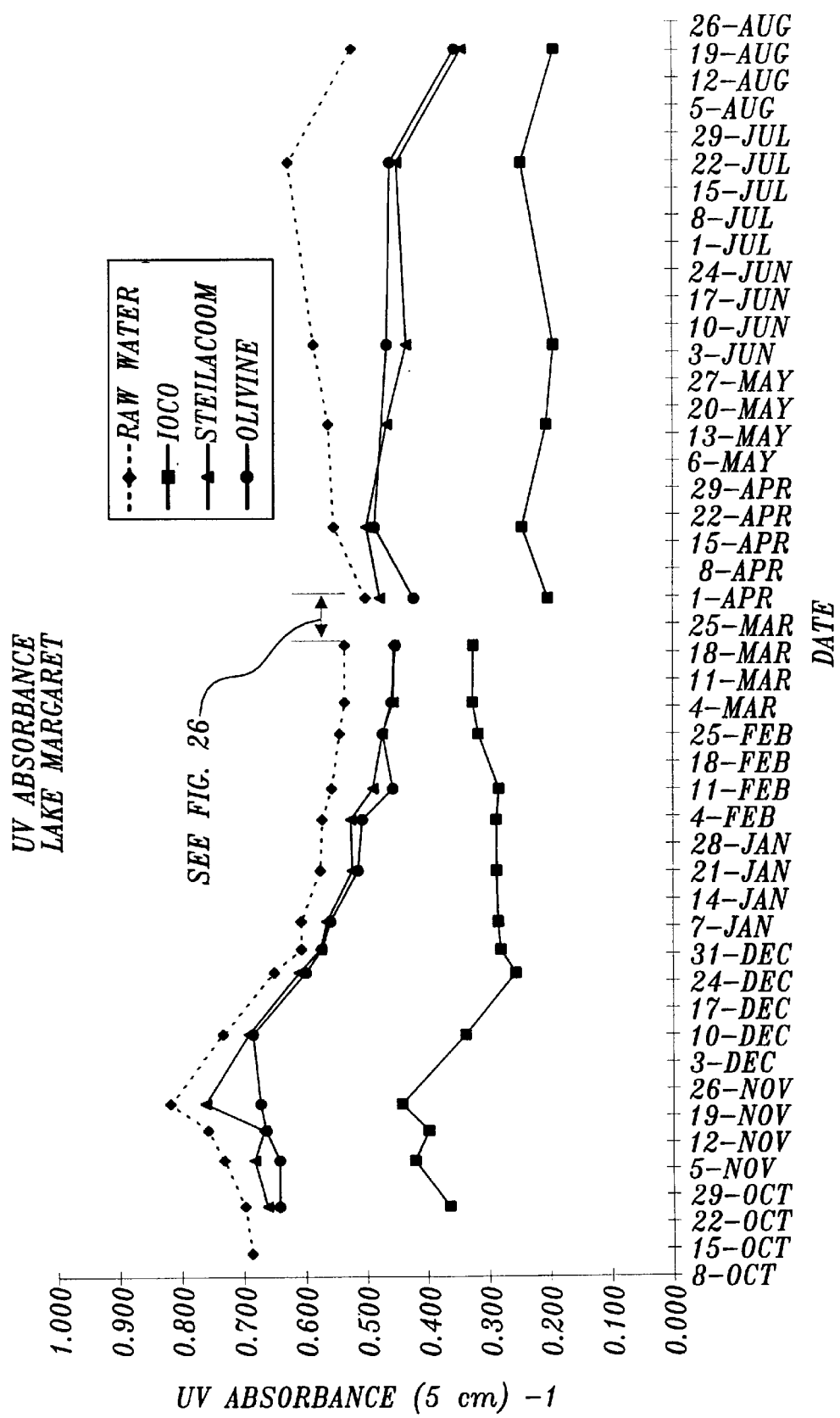
FIG. 22 is a graph of the ultraviolet absorbence at 254 nanometers of raw and filtered water from Lake Margaret for each of the three test beds described in Example 6.

FIG. 21 depicts raw and filtered water DOC concentrations for the ten month test period at Lake Margaret. FIG. 22 depicts the data for raw and filtered water absorbence at 254 nanometers over the same time period. Average removal efficiencies based on DOC and UV absorbence for the time periods before and after the chlorination event are set forth in Table 2 below. DOC and UV absorbence removal efficiencies immediately following the March 20 chlorination are presented and discussed in Example 7.

TABLE 2

| Filter | Pre-chlorination, 10/30–3/20 | | Post-chlorination, 4/18–8/19 | |
|---|---|---|---|---|
| | Removal of UV absorbence at 254 nm, % | Removal of DOC, % | Removal of UV absorbence at 254 nm, % | Removal of DOC, % |
| IOCO | 48 | 35 | 62 | 45 |
| Olivine | 12 | 7 | 23 | 22 |
| Steilacoom | 9 | 5 | 23 | 20 |

The removal efficiency for organics at Lake Margaret was somewhat lower than at Cle Elum, but the relative performance of the three media removal was qualitatively similar at the two sites. If anything, the superiority of the iron oxide-coated material was even more dramatic at Lake Margaret. Organics removal was extremely slight in the olivine and sand columns initially and increased in the late spring and summer, apparently due to seasonal warming, whereas substantial DOC removal occurred in the IOCO column from the initiation of the test.

Figure 23:
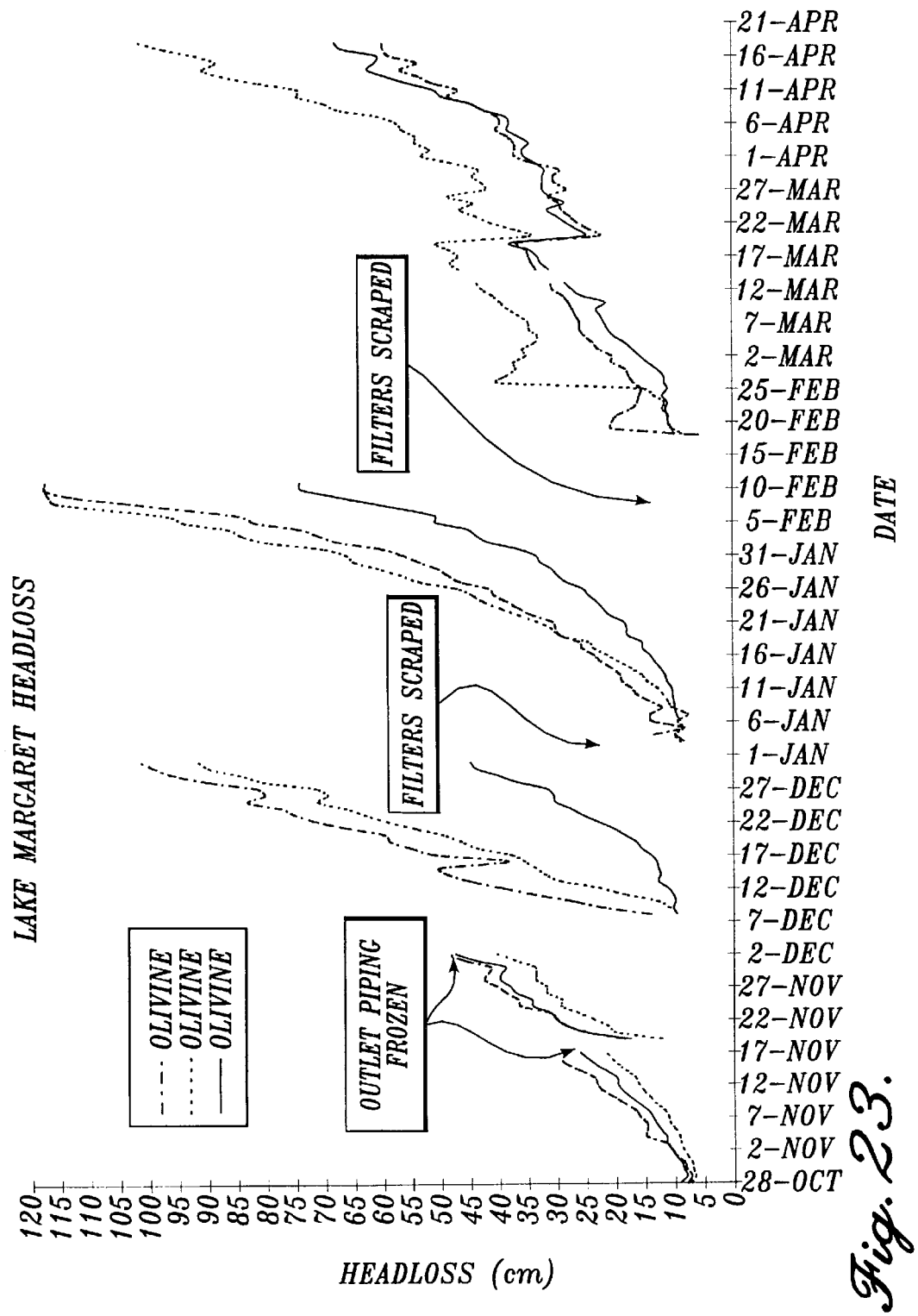
FIG. 23 is a graph of the head loss curves for each bed of media of FIGS. 20, 21, and 22.

FIG. 23 presents head loss data for each column during treatment of the Lake Margaret water source. The increased head loss over time apparent in the IOCO-packed filter suggests that the IOCO might be enhancing the biological activity in the filter, and this enhanced activity might be responsible for the removal of the DBP precursors. It is not clear how dominant this mechanism is, however, because the head loss in the system containing uncoated olivine is very similar to that of IOCO, and the uncoated olivine column did not enhance precursor removal.

The foregoing results illustrate the effectiveness of iron oxide coated olivine as a filter medium for use in slow filtration. The iron oxide coated olivine filter medium removes natural organic matter to a degree up to about four times greater than the amount of natural organic matter removal by uncoated olivine and Steilacoom sand in the above tests.

There was no evidence in this example that the capacity of the IOCO column to remove DOC was nearing exhaustion, and up to the time when the column was chlorinated, the cumulative DOC removal was 1,905 mg/DOC per liter of bed, or 165 mg DOC/m$^2$ of surface area.

A direct comparison of the performance of IOCO in the rapid (Example 4) and slow (Example 6) filtration studies is difficult because the water sources used in the two examples were different. However, the water quality of the test water used in Example 4 was similar with respect to pH, DOC and UV absorbence to the Lake Margaret water used in Example 6. In light of that, it appears that the IOCO used in the slow filtration process as described in Example 6 could remove an indeterminate amount of additional DOC, thus it appears that slow filtration through IOCO is capable of removing more DOC from water than rapid filtration through the same medium.

Removal of DOC during a rapid filtration process such as in Example 4 through IOCO is attributable solely to adsorption. The improved removal when the filtration rate is decreased as in Example 6 is most likely due to a combination of greater adsorption (attributable to increased time for diffusion into the iron oxide coating) and biological activity in the filter. The following Example 7 illustrates the effect that these two removal mechanisms have on the ability of a filter medium in a given filtration process to remove DOC.

Example 7

Figure 24:
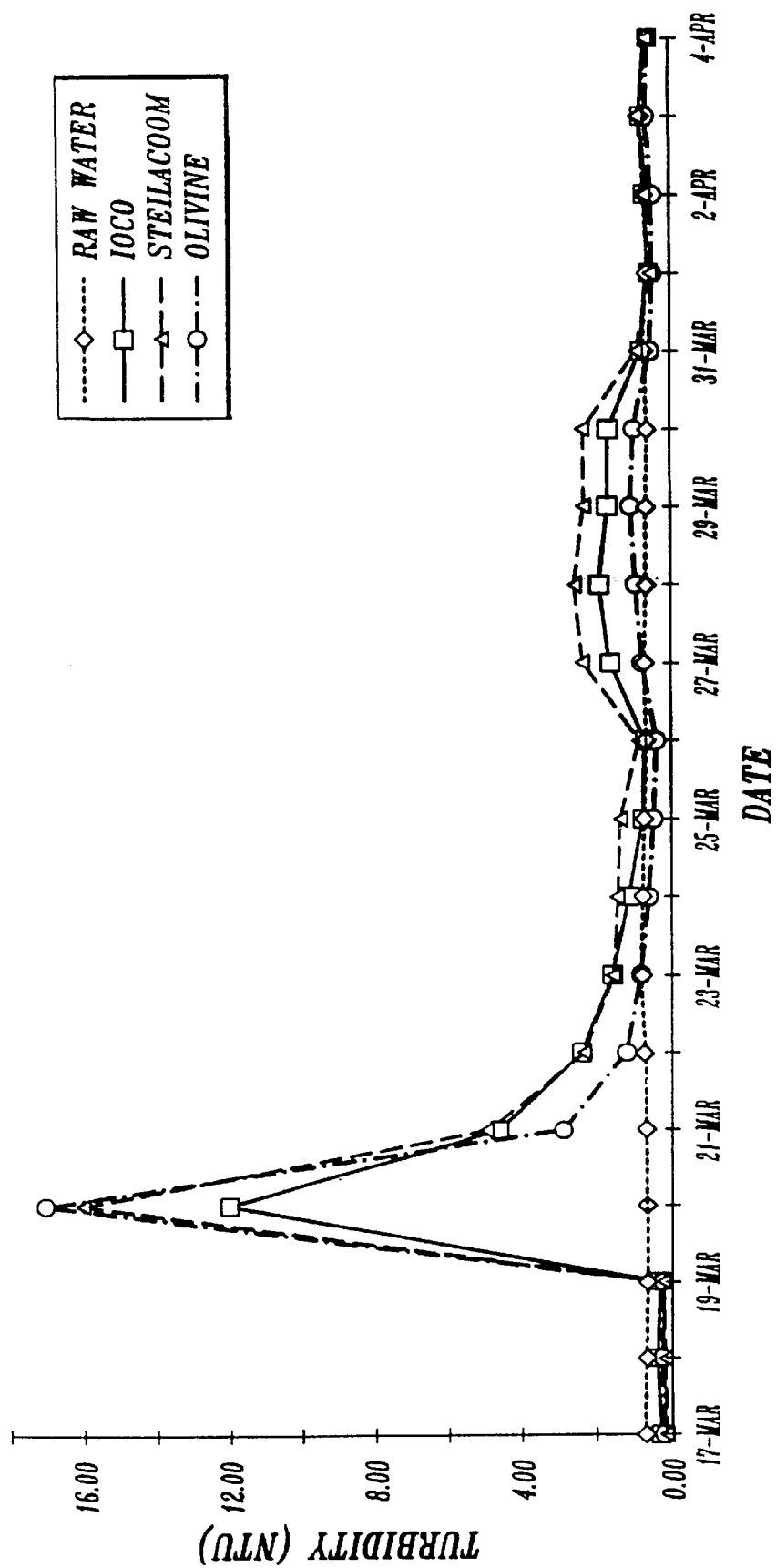
FIG. 24 is a graph of the turbidity of raw and filtered water from Lake Margaret before and after chlorination.
Figure 25:
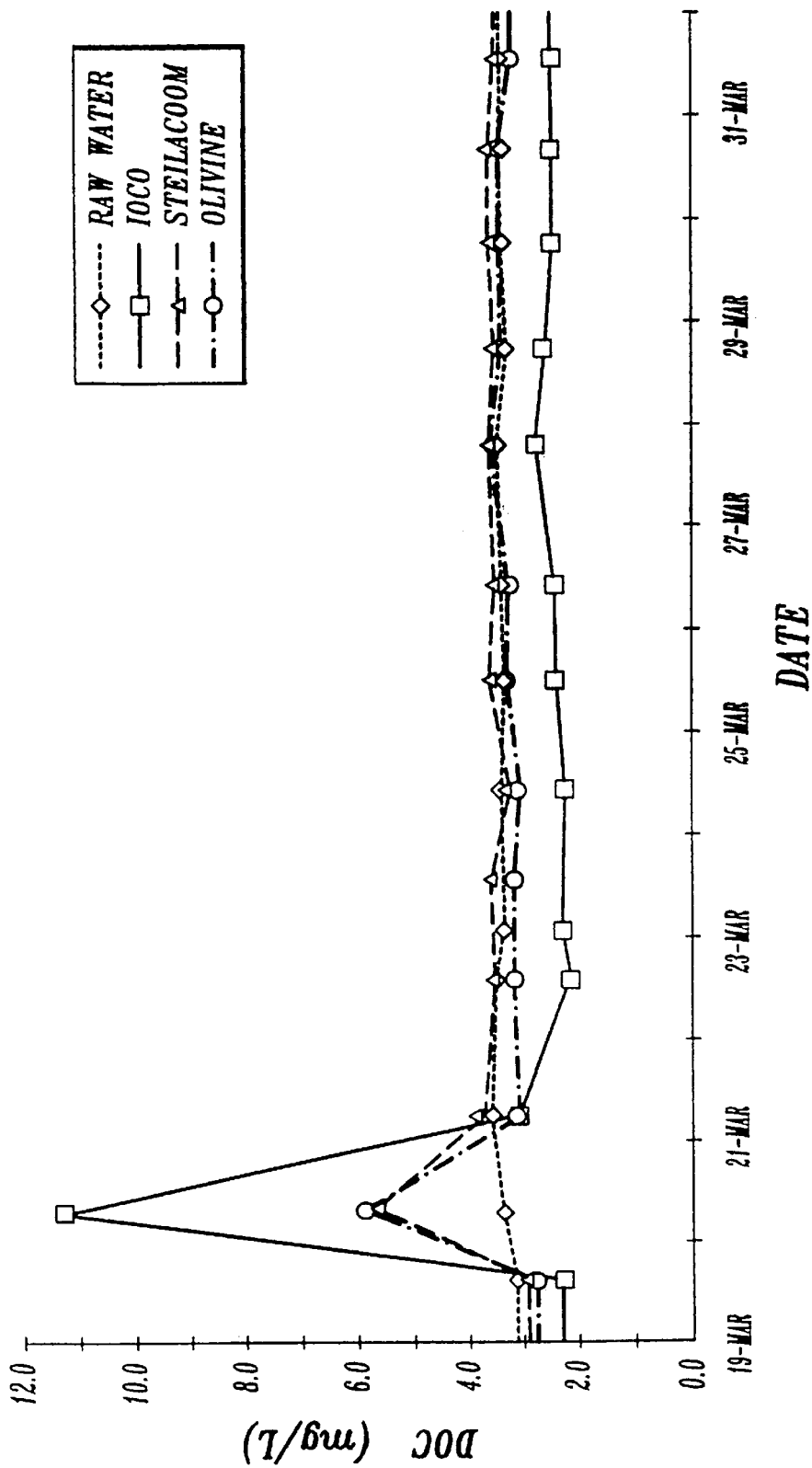
FIG. 25 is a graph of DOC concentration for raw and filtered water from Lake Margaret before and after chlorination.

As noted above, in mid-March, each of the columns of Example 6 was dosed with a concentrated chlorine solution. This solution was prepared by slowly adding approximately 500 ml of 5.25% chlorine bleach to 10 liters of head water over each filter, providing an initial chlorine concentration of approximately 2,500 mg per liter. The initial pH of the chlorinated head water was approximately 10. Following chlorination, raw and filtered water samples were collected daily for two weeks and analyzed for organic carbon, UV absorbence at 254 nm, and turbidity. FIGS. 24–26 illustrate the immediate effect of chlorination on dissolved organic matter and turbidity release from each column. The high chlorine dose and high pH of the chlorinated water disrupted bacterial attachment and oxidized some captured organics in all columns. Following the substantial DOC release from each column, DOC removal in the IOCO filter recovered to 38% within two days, comparable to its prechlorination average removal of 35%. Two days after chlorination, removal of NOM by olivine was improved compared to the prechlorination value (15% vs. 7%); however, its performance deteriorated rapidly, and seven days after the chlorination, raw and filtered water DOC concentrations were essentially equal. The Steilacoom sand filter provided no removal in the period immediately following chlorination.

In contrast to DOC removal, which was approximately the same in the IOCO filter and improved only slightly in the olivine filter shortly following chlorination, removal of UV254 increased by 100% and 60% in these two filters, respectively. On the other hand, neither DOC removal nor removal of UV254 absorbence was improved by chlorination in the Steilacoom sand filter. These results are consistent with the scenario in which some of the organics that were adsorbed on the surface of the olivine and IOCO were oxidized by the chlorine and/or desorbed by the high pH, freeing sorption sites that could be reoccupied when the systems were restarted. The much lower sorption capacity of the olivine column accounts for the decrease in its DOC removal efficiency over the course of the following week. Sorption is also consistent with the selective removal of organics that absorb UV light. The sorption capacity of the Steilacoom sand for organics is negligible, accounting for its behavior.

Following the chlorination, all filters were placed back in service. With the exception of the olivine filter, which was out of operation for approximately two weeks in mid-May, the filters ran continuously through August 21. Filter scraping was performed on April 20, June 25 and July 28. Head loss and turbidity were not monitored during this period, however samples for DOC and UV analysis were taken April 18, May 15, June 4, July 21 and August 19. Dissolved oxygen concentrations in the head water and effluent of each filter were determined on July 21 and August 19.

On August 19, following sample collection for analysis of raw and filtered DOC, UV absorbence, and DO, all filters were drained to just below the filter media surface, and then slowly backfilled with a solution containing 100 mg/liter free chlorine. The solution was prepared by diluting 5.25% bleach with filtered lake water, with a resulting pH of approximately 9. Water backfilling the column exited the top of the filter and overflowed to waste. Backfilling continued until approximately 45 liters of chlorinated water passed through each filter. At that time, the total chlorine concentration in the overflow from each of the filters was approximately 70 mg/liter. The filters were then placed back in service and operated at a filter approach velocity of 0.43 feet per hour (0.05 gal/minute-ft$^2$) for 48 hours. Two days later, chlorine residual tests were conducted to ensure no chlorine residual was present, and performance data was again collected.

TABLE 3

NOM and dissolved oxygen removal before and after chlorination

| Filter | July 21* % DOC Removal % UV254 Removal | July 21‡ Filtered DO (mg/l) | Aug. 19† % DOC Removal % UV254 Removal | Aug. 19** Filtered DO (mg/l) | Aug. 21† % DOC Removal % UV254 Removal | Aug. 21§ Filtered DO (mg/l) |
|---|---|---|---|---|---|---|
| IOCO | 48 | | 53 | | 10 | |
|  | 61 | 4.5 | 63 | 4.1 | 26 | 8.1 |
| Steilacoom | 30 | | 35 | | −17 | |
|  | 28 | 5.9 | 34 | 6.1 | −3 | 8.1 |
| Olivine | 29 | | 34 | | −16 | |
|  | 27 | 6.0 | 32 | 6.1 | −4 | 8.0 |

*Raw water DOC: 4.7 mg/l Raw water UV254: 0.13 cm$^{-1}$
†Raw water DOC: 4.0 mg/l Raw water UV254: 0.11 cm$^{-1}$
‡Raw water DO: 7.9 mg/l
**Raw water DO: 8.5 mg/l
§Raw water DO: 8.1 mg/l Table 3 shows the removal of DOC, UV absorbence, and DO in each filter prior to and following chlorination. DOC and UV absorbence removals before disinfection were high in all filters relative to values commonly reported in the literature, indicating robust biological activity. Post chlorination, there was no oxygen utilization in any of the columns, indicating virtual absence of biological activity. There was also no removal of NOM in the olivine or Steilacoom filters; in fact, disruption of attached bacteria and partial oxidation and/or desorption of NOM and extracellular polymers likely contributed to the net shedding of DOC. By contrast, although NOM removal in the IOCO filter was significantly reduced compared to its pre-chlorination value, some removal was clearly occurring. The net removal in this column probably reflects a combination of shedding and adsorption, and it is not possible to identify the relative contribution of each without detailed analysis of the filter effluent.

There is little question that capture of NOM within the olivine and Steilacoom filters was almost entirely a result of bioactivity. Evidence of this lies in the poor removal seen during the winter months, and the cessation of removal following disinfection. As discussed above, biological factors contributed significantly to NOM removal through IOCO as well.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A method for treating water containing natural organic matter to reduce the concentration of the natural organic matter, the method comprising the step:

contacting the water containing the natural organic matter with a medium comprising an iron-oxide coated mineral having an olivine structure.

2. The method of claim 1, wherein the mineral having an olivine structure is selected from the group consisting of olivine, tephroite, monticellite, and larsenite.

3. The method of claim 1, wherein the water containing the natural organic matter is contacted with a bed of the iron-oxide coated mineral having an olivine structure at a rate less than about 0.25 meters/hour.

4. The method of claim 1, wherein ultraviolet absorbence at 254 nanometers of the water containing natural organic matter after being contacted with the iron-oxide coated mineral having an olivine structure is at least about 30 percent less than the ultraviolet absorbence at 254 nanometers of the water containing natural organic matter before being contacted with the iron-oxide coated mineral having an olivine structure.

5. The method of claim 4, wherein the ultraviolet absorbence at 254 nm decreases at least about 50%.

6. The method of claim 1, wherein the dissolved total organic carbon content of the water containing natural organic matter is reduced by at least 20% after being contacted with a bed of the iron-oxide coated mineral having an olivine structure.

7. The method of claim 1, wherein the medium comprising an iron-oxide coated mineral having an olivine structure is prepared by:

preparing an aqueous solution containing ferric chloride and hydroxyl ion;

heating the solution to provide a paste;

contacting the paste with the mineral having an olivine structure; and drying the mixture.

8. The method of claim 1, wherein the medium comprising an iron-oxide coated mineral having olivine structure is prepared by contacting an aqueous solution containing ferric nitrate with the iron-oxide coated mineral having an olivine structure to form a mixture; and heating the mixture to dryness.

* * * * *

UNITED STATES PATENT AND TRADEMARK OFFICE
CERTIFICATE OF CORRECTION

PATENT NO. : 5,911,882
DATED : June 15, 1999
INVENTOR(S) : M.M. Benjamin et al.

It is certified that error appears in the above-identified patent and that said Letters Patent is hereby corrected as shown below:

On the title page, item [54] and column 1, line 1:

| | | |
|---|---|---|
| [54] Pg. 1, col. 1 | Title | Before "REMOVING" insert --METHOD FOR-- |
| [57] Pg. 1, col. 2 | Abstract line 3 of text | "material" should read --materials-- |
| [56] Pg. 2, col. 2 | Refs. Cited (Other Publs., item 15) | After "21(9):863-869" and before "." insert --, 1987-- |
| [56] Pg. 2, col. 2 | Refs. Cited (Other Publs., item 16) | "filtration,*Journal*" should read --filtration," *Journal*-- |

Signed and Sealed this

Twenty-second Day of February, 2000

Attest:

Q. TODD DICKINSON

*Attesting Officer*  *Commissioner of Patents and Trademarks*